United States Patent
Bakshi et al.

(10) Patent No.: US 12,488,142 B2
(45) Date of Patent: *Dec. 2, 2025

(54) OBTAINING TRUSTED E-SIGNATURES

(71) Applicant: Box, Inc., Redwood City, CA (US)

(72) Inventors: Rohit Bakshi, Campbell, CA (US); Yi Zhao, Redwood City, CA (US); Kanav Gandhi, Mountain View, CA (US); Areg Alimian, Woodland Hills, CA (US); Will Carlson, Glenview, IL (US); Virender Gupta, Morganville, NJ (US); Sanjiv Pandey, Henderson, NV (US); Kechen Huang, Menlo Park, CA (US)

(73) Assignee: Box, Inc., Redwood City, CA (US)

( * ) Notice: Subject to any disclaimer, the term of this patent is extended or adjusted under 35 U.S.C. 154(b) by 211 days.

This patent is subject to a terminal disclaimer.

(21) Appl. No.: 18/129,734

(22) Filed: Mar. 31, 2023

(65) Prior Publication Data

US 2023/0306133 A1 Sep. 28, 2023

Related U.S. Application Data

(63) Continuation-in-part of application No. 17/390,153, filed on Jul. 30, 2021.
(Continued)

(51) Int. Cl.
*G06F 21/00* (2013.01)
*G06F 21/62* (2013.01)
*G06F 21/64* (2013.01)

(52) U.S. Cl.
CPC ........ *G06F 21/6245* (2013.01); *G06F 21/645* (2013.01)

(58) Field of Classification Search
None
See application file for complete search history.

(56) References Cited

U.S. PATENT DOCUMENTS

| 7,346,668 B2 | 3/2008 | Willis |
| 7,428,591 B2 | 9/2008 | Stebbings |

(Continued)

OTHER PUBLICATIONS

"Configure behavior detection," Okta Help Center, dated obtained via Internet Archive as Apr. 20, 2021, URL: https://help.okta.com/en/prod/Content/Topics/Security/behavior-detection/configure-behavior-detection.htm.
(Continued)

*Primary Examiner* — Shin-Hon (Eric) Chen
(74) *Attorney, Agent, or Firm* — Vista IP Law Group, LLP

(57) ABSTRACT

Methods, systems, and computer program products for content management systems. Multiple components are operatively interconnected to carry out operations for establishing a user device trust level. A content management system facilitates interactions between a plurality of user devices and a plurality of shared content objects. The plurality of user devices are network connected to the content management system. One of the user devices issues a request to access a particular one of the content objects. Responsive to the request, a two-step device check is performed before granting access to the particular one of the content objects. A first step of the two-step device check process is based on environmental information, and a second step of the two-step device check process is based at least in part on analysis of the content of the particular one of the content objects. The actual bits of the content object itself are inspected.

20 Claims, 20 Drawing Sheets

Related U.S. Application Data

(60) Provisional application No. 62/706,868, filed on Sep. 14, 2020.

(56) References Cited

U.S. PATENT DOCUMENTS

| | | | |
|---|---|---|---|
| 7,434,048 B1* | 10/2008 | Shapiro | H04L 9/321 |
| | | | 713/165 |
| 8,640,251 B1 | 1/2014 | Lee et al. | |
| 9,979,500 B2* | 5/2018 | Raman | H04H 60/32 |
| 10,885,410 B1 | 1/2021 | Rule et al. | |
| 10,949,382 B2 | 3/2021 | Hammer et al. | |
| 11,327,665 B2* | 5/2022 | Gkoulalas-Divanis | |
| | | | G06F 3/0679 |
| 11,509,658 B1* | 11/2022 | Kulkarni | H04W 12/60 |
| 11,962,578 B2* | 4/2024 | Steeves | H04L 63/0823 |
| 2001/0023421 A1 | 9/2001 | Numao et al. | |
| 2011/0014972 A1 | 1/2011 | Herrmann et al. | |
| 2013/0227285 A1 | 8/2013 | Bracher et al. | |
| 2014/0013422 A1 | 1/2014 | Janus et al. | |
| 2014/0129942 A1 | 5/2014 | Rathod | |
| 2015/0213568 A1* | 7/2015 | Follis | G06Q 50/18 |
| | | | 705/311 |
| 2015/0271267 A1 | 9/2015 | Solis et al. | |
| 2016/0179776 A1* | 6/2016 | Bartley | G06Q 20/027 |
| | | | 715/268 |
| 2016/0188902 A1* | 6/2016 | Jin | H04W 4/029 |
| | | | 726/28 |
| 2016/0253509 A1* | 9/2016 | Wibran | G06F 21/6209 |
| | | | 726/1 |
| 2016/0373515 A1 | 12/2016 | Jagad et al. | |
| 2017/0041296 A1* | 2/2017 | Ford | G06F 21/64 |
| 2017/0251231 A1 | 8/2017 | Fullerton et al. | |
| 2018/0267862 A1 | 9/2018 | Aseev et al. | |
| 2018/0278614 A1 | 9/2018 | Miller et al. | |
| 2020/0067705 A1* | 2/2020 | Brown | G06F 21/645 |
| 2020/0092300 A1 | 3/2020 | Mital et al. | |
| 2020/0145226 A1* | 5/2020 | Haddad | G06F 21/6218 |
| 2020/0226703 A1 | 7/2020 | Abad et al. | |
| 2020/0242159 A1* | 7/2020 | Dain | G06F 11/3034 |
| 2020/0266996 A1* | 8/2020 | Carrott | H04L 63/0838 |
| 2020/0274861 A1 | 8/2020 | Black et al. | |
| 2021/0021423 A1 | 1/2021 | Latorre et al. | |
| 2021/0081923 A1 | 3/2021 | Rafferty et al. | |
| 2021/0099453 A1 | 4/2021 | Cohen et al. | |
| 2021/0350011 A1* | 11/2021 | Ashlock | G06N 20/00 |
| 2021/0350033 A1 | 11/2021 | Kapinos et al. | |
| 2022/0210173 A1* | 6/2022 | Katmor | H04L 63/1416 |

OTHER PUBLICATIONS

"Okta Device Trust solutions," Okta Help Center, date obtained via Internet Archives as May 7, 2021, URL: https://help.okta.com/en/prod/Content/Topics/device-trust/device-trust-landing.htm.

Non-Final Office Action dated Dec. 12, 2022 for U.S. Appl. No. 17/390,153.

Final Office Action dated Mar. 31, 2023 for U.S. Appl. No. 17/390,153.

Crowstrike, "Falcon Insight: Endpoint Detection and Response (EDR)", CrowdStrike Products, dated May 19, 2023.

Revankar, Mehul, "A Deep Dive into VMDR 2.0 with Qualys TruRisk", Last updated Mar. 1, 2023.

Non-Final Office Action dated Sep. 15, 2023 for U.S. Appl. No. 17/390,153.

Final Office Action dated Jan. 24, 2024 for U.S. Appl. No. 17/390,153.

Non-Final Office Action dated Sep. 16, 2024 for U.S. Appl. No. 17/390,153.

Final Office Action dated Jan. 30, 2025 for U.S. Appl. No. 17/390,153.

Notice of Allowance dated Apr. 15, 2025 for U.S. Appl. No. 17/390,153.

* cited by examiner

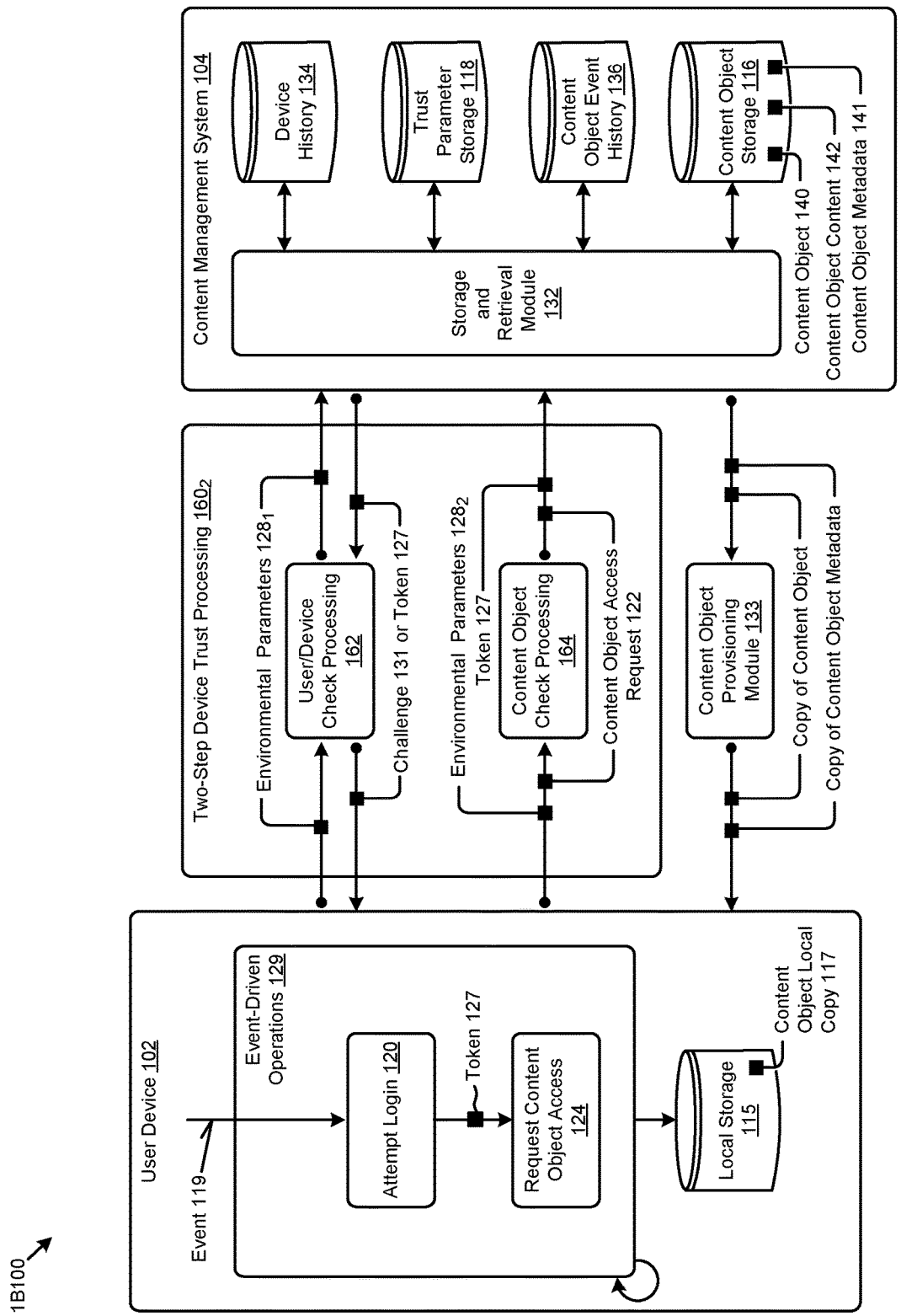
FIG. 1B1

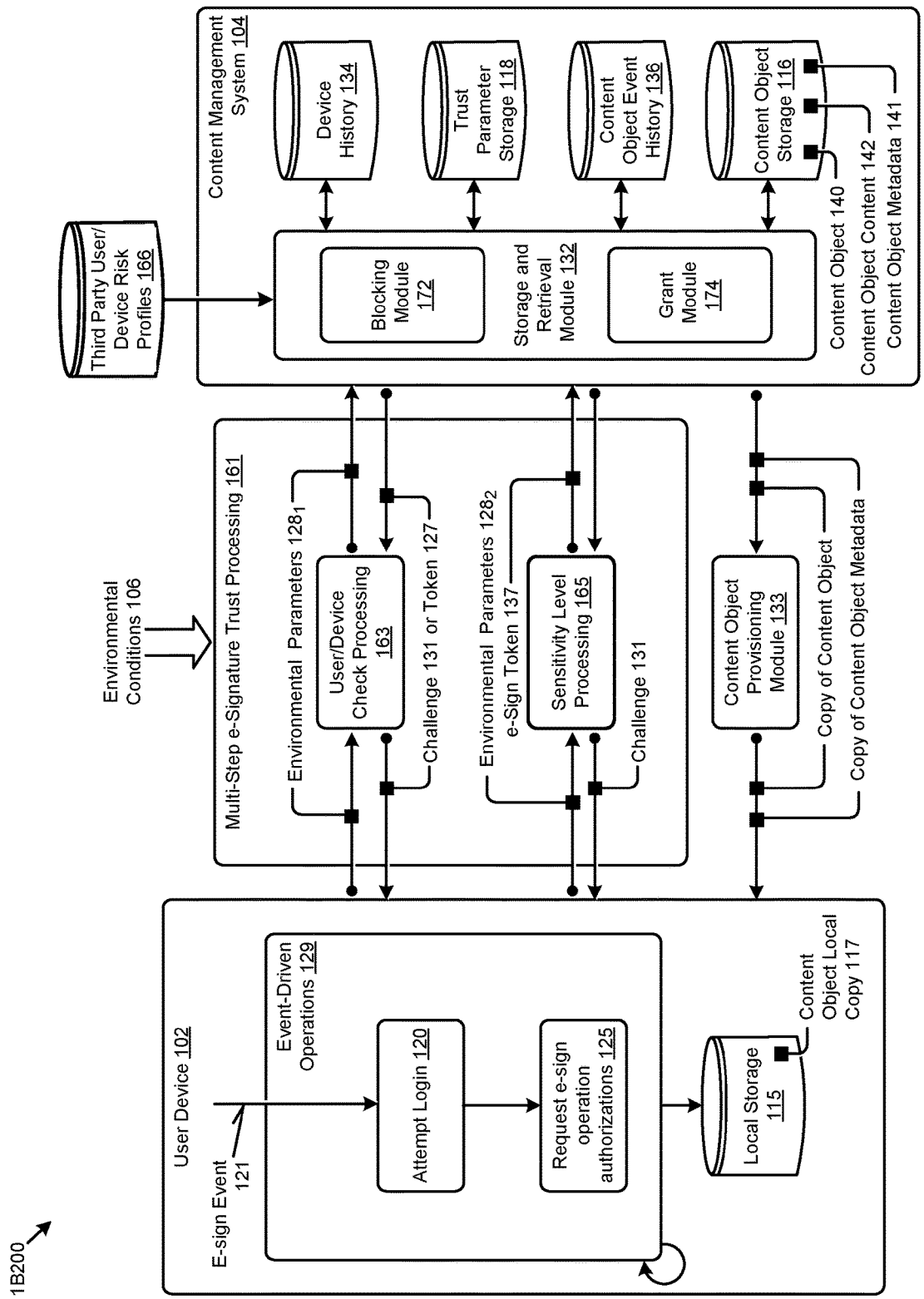
FIG. 1B2

6A00

Rulebase 501

| Logical Expression | IF TRUE | IF FALSE | Override |
|---|---|---|---|
| Label=='Sensitive'<br>AND<br>Device=='Remote' | Deny | Allow | — |
| Device=='Remote'<br>AND<br>Content.contains(PII) | Deny | Allow | — |
| Device=='Remote'<br>AND<br>Content.contains(PII)<br>AND<br>MFA='Stale' | Challenge | — | — |
| Device=='Remote'<br>AND<br>History=='Suspicious' | Deny | — | — |
| User.role=='Admin' | Allow | — | Yes |
| Accumulated Trust<br>>=Threshold(Action) | Allow | Deny | — |
| User=='Suspicious'<br>AND<br>Network=='Unknown' | Deny &<br>Report | Allow | Deny |
| ⋮ | ⋮ | ⋮ | ⋮ |

Actions 601

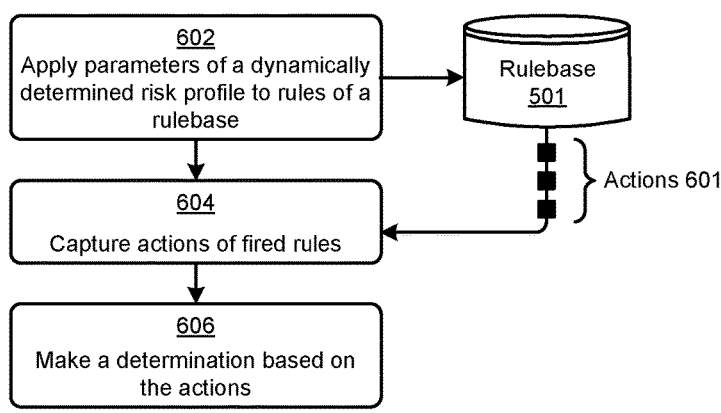

FIG. 6B

OBTAINING TRUSTED E-SIGNATURES

RELATED APPLICATIONS

The present application is a continuation-in-part of, and claims the benefit of priority to U.S. patent application Ser. No. 17/390,153 titled "ESTABLISHING USER DEVICE TRUST LEVELS" filed on Jul. 30, 2021, which claims priority to U.S. Provisional Patent Application Ser. No. 62/706,868 titled "DIGITAL SECURITY" filed on Sep. 14, 2020, all of which are hereby incorporated by reference in their entirety.

TECHNICAL FIELD

This disclosure relates to content management systems, and more particularly to techniques for establishing user device trust levels.

BACKGROUND

Computers and mobile smart devices (e.g., mobile smart phones, tablets, etc.) are ubiquitous. Whereas in earlier timeframes, most computing was performed using desktop or deskside computers, in modern times, a great deal of computing is done using mobile smart devices. Whereas desktop or deskside computers are relatively stationary, modern smart devices are highly mobile, sometimes small enough to fit into a pocket, and often configured for online access from any location and at any time. While device mobility adds a great deal of convenience that inures to the user, such mobility also introduces risk of mal-appropriation of the information going in and out of the device, as well as mal-appropriation of the device itself. As such, the device itself as well as the environment in which the device is being operated needs to be vetted so as to be trusted to a level appropriate for the information going in and out of the device.

Passwords and other forms of vetting a user or device only partially address the need to establish a trust level. Furthermore, even techniques such a multi-factor authentication merely improve the likelihood that a user or device is fact the user or device that is being authenticated. Techniques such as deep packet inspection observe and report on network traffic and device mobility, but fail to assess the overall trustworthiness of the device with respect to specific operations that would or could be initiated by the device. The need for vetting a user or device becomes more complicated when there are multiple participants, each of whom might need to be individually vetted. This situation becomes even more complicated when user authentication is imperative, such as when a legal document having binding provisions needs to be signed by trusted parties and/or such as when a legal document having binding provisions needs to be communicated between trusted devices over trusted infrastructure.

Legacy techniques are deficient in terms of establishing trust levels that apply to people and information as well as networks and devices. What is needed are improved ways to establish user device trust levels.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for establishing user device trust levels, which techniques advance the relevant technologies to address technological issues with legacy approaches. More specifically, the present disclosure describes techniques used in systems, methods, and in computer program products for allowing or denying access to content management system data according to trust levels that are determined based on relationships between the device and the actual content of a content object to be accessed. Embodiments are directed to technological solutions that include content-based determinations when making deny/allow decisions. Some embodiments are directed to technological solutions that include making trust determinations during the course of processing a workflow.

Many of the herein-disclosed embodiments include content-based determinations for making trust decisions and/or for making access deny/allow decisions are technological solutions pertaining to technological problems that arise in the hardware and software arts that underlie content management systems. Aspects of the present disclosure relate to improvements in peripheral technical fields as well, including, but not limited to, distributed storage systems and computerized authentication and authorization.

Some embodiments include a sequence of instructions that are stored on a non-transitory computer readable medium. Such a sequence of instructions, when stored in memory and executed by one or more processors, causes the one or more processors to perform a set of acts for using content-specific information when making trust decisions and/or for making access deny/allow decisions.

Some embodiments include the aforementioned sequence of instructions that are stored in a memory, which memory is interfaced to one or more processors such that the one or more processors can execute the sequence of instructions to cause the one or more processors to implement acts for using content-specific information when making trust decisions and/or for making access deny/allow decisions.

In various embodiments, any combinations of any of the above can be organized to perform any variation of acts for allowing or denying access to content management system data according to content-based device trust levels, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B1 shows an example configuration of a system for allowing or denying access to content management system data according to content-based device trust levels, according to an embodiment.

FIG. 1B2 shows an example configuration of a system for allowing or denying e-sign operations based on dynamically determined risk profiles, according to an embodiment.

FIG. 6A depicts a rule codification technique as used in systems that process dynamically determined risk profiles when determining whether or not to allow or deny operations, according to an embodiment.

FIG. 6B depicts an action determination flow that is used in conjunction with a rulebase, according to an embodiment.

DETAILED DESCRIPTION

Figure 1A:
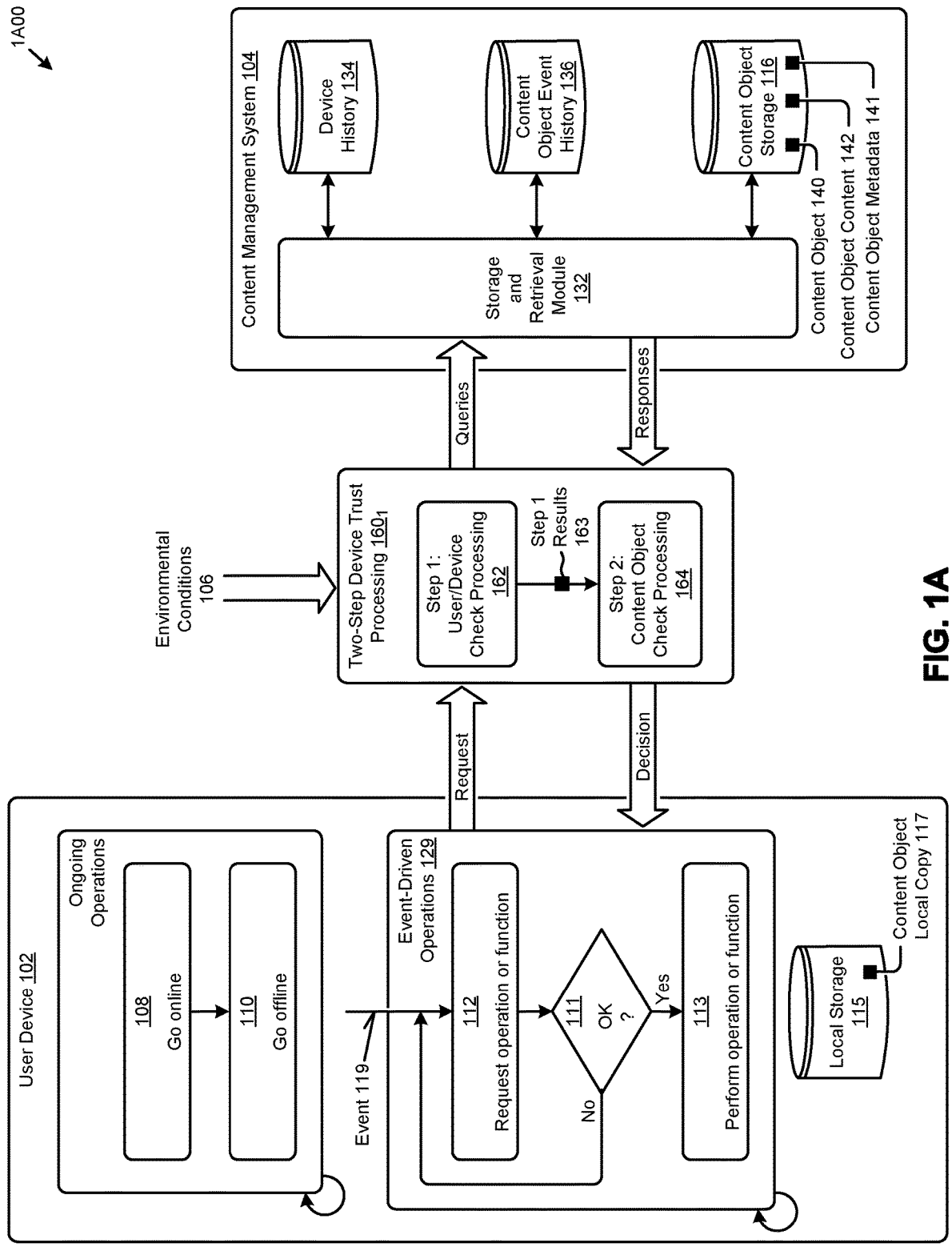
FIG. 1A exemplifies an environment in which systems for allowing or denying access to content management system data according to content-based device trust levels can be implemented.

Aspects of the present disclosure solve problems associated with using computer systems for making content-based deny/allow decisions. The accompanying figures and discussions herein present example environments, systems, methods, and computer program products for allowing or denying access to content management system data according to content-based device trust levels.

Overview

The determination to allow or deny access to information (e.g., access to a file or database or URL, etc.) can be based on the type of device and/or authentication of the device, and/or authentication of a user of the device, and/or based on environmental conditions under which the device is operating. Such determinations, in particular determinations to deny access can thwart mal-appropriation of information. Unfortunately, such determinations are very coarse, and fail to consider the nature of the specific information sought to be accessed. As a consequence of such coarse determinations, a device/user might be denied access to the sought-after information-even though the sought-after information had been made public.

Further, and also as a consequence of such coarse determinations, a device/user might be permitted access to the sought-after information-even though the sought-after information is too sensitive to be delivered (for example) into an unsecured and/or unfriendly environment. Disclosed hereunder are device checks that consider aspects of the user, the device itself, and the device environment, in combination with aspects of the sought-after information.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment 1A00 in which systems for allowing or denying access to content management system data according to content-based device trust levels can be implemented. The figure is being presented to show how a plurality of user devices (e.g., user device 102) interacts with a content management system 104 in accordance with two-step device trust processing that controls whether to allow (or deny) performance of a particular operation or function of the content management system by a particular user device.

As shown, the user device 102 is continually performing ongoing operations such as going online (e.g., via online operation 108) and then going offline (via offline operation 110), etc. There may be many reasons for making a transition from online to offline or from offline to online. During the transitions from online to offline and back, aspects of the environment (e.g., the shown environmental conditions 106) may change. The changes may occur prior to, or during, or after a transition. Aspects of the then-current environment are used to inform the two-step device trust processing 160I. Strictly as one example, the aspect of whether the user device is communicating in clear-text (e.g., over a public network) or whether the device is communicating within a virtual private network (VPN) can influence whether or not a particular access to particular sought-after information is to be allowed or denied. Aspects of the environment can be combined with aspects of sought-after information, and analysis of the combination can then be used to determine whether a particular operation or function over some particular content object is to be allowed or denied.

In the embodiment shown, the two-step device trust processing 160I implements a fine-grained allow/deny device trust regime based on the combination of user/device check processing and content object check processing. More specifically, in response to a user request (e.g., event 119), user/device check processing 162 (e.g., step 1, as shown) produces user/device check results (e.g., step 1 results 163), which are then used by content object check processing 164 (e.g., step 2, as shown) to reach a then-current decision to allow or deny, or to allow in part or deny in part the user request.

The aforementioned user request and/or additional user requests may be raised continually in a loop of event-driven operations 129. The event-driven operations may include raising a request to perform a content management system (CMS) operation or function (e.g., step 112), performing a test (e.g., test 111) to confirm if (or when) the operation is permitted, and then performing a permitted operation or function (e.g., step 113) if and when permitted. The CMS operation or function may relate to a content object that is stored in the CMS system (e.g., content object 140), or the CMS operation or function may relate to a content object that is stored in local storage 115. More specifically, the CMS operation or function may relate to a shared copy of content object 140 that is stored in content object storage 116 of the CMS system, or the CMS operation or function may relate to a content object local copy 117 that is stored in a local storage area that is local to the user device.

Returning to the discussion of the two-step device trust processing, the user/device check processing 162 and/or the content object check processing 164 may be informed by responses returned by the CMS. Such responses may include aspects of user device history 134, and/or aspects of content object metadata 141, and/or aspects of the actual content of a content object (e.g., content object content 142), and/or aspects of content object event history 136, etc.

As used herein, the content of a particular content object refers to the actual stored bits or actual stored bytes that comprise the particular content object. As such, content inspection of the contents of the file or other type of content object refers to consideration of the actual stored bits or actual stored bytes that comprise the file or other type of content object. In some cases, tags and/or other forms of metadata pertaining to a file or content object are stored as bits or bytes within the file or content object.

The content management system 104 may include a storage and retrieval module 132 that processes a query (as shown) so as to gather information from any of the aforementioned sources (e.g., based upon or derived from any one or more, or any combination of information in the user device history, and/or aspects of content object metadata, and/or aspects of content object event history).

Forming any one or more specific, detailed queries involved in establishing user device trust levels may be facilitated by operational elements within the shown two-step device trust processing. Additionally, or alternatively, the detailed queries involved in establishing user device trust levels may be facilitated by operational elements of the user device. In some cases, operational elements within the shown two-step trust processing cooperate with operational elements of the user device, for example, to gather values pertaining to then-current environmental conditions.

An example configuration of a system for allowing or denying access to content management system data, including various embodiments of user/device check processing 162 and content object check processing 164 are shown and described as pertains to FIG. 1B1.

FIG. 1B1 shows an example configuration 1B100 of a system for allowing or denying access to content management system data according to content-based device trust levels. As an option, one or more variations of configuration 1B100 or any aspect thereof may be implemented in the context of the architecture and functionality of the embodiments described herein and/or in any environment.

The figure is being presented to illustrate how a range of environmental parameters and a range of trust parameters inform both the aforementioned user/device check processing 162 as well as content object check processing 164. Specifically, the figure is being presented to illustrate how a first set of environmental and trust parameters can be used to inform device check processing, whereas a second set of environmental and trust parameters are used to inform content object check processing.

In the embodiment shown in FIG. 1B1, the user/device check processing is invoked by a login attempt 120. The login attempt may include steps for gathering environmental conditions. In some cases, operational elements of the user device respond to an event (e.g., event 119) and initiate a login attempt. In some cases, prior to invocation of a login attempt, various operational elements of the user device gather values of environmental parameters, which values pertain to then-current environmental conditions. Such values of environmental parameters may include details of the user device itself and/or details of the network to which the user device is connected. In some cases, various then-current values of environmental parameters are used to assess vulnerabilities that may be exposed as a consequence of the then-current environmental conditions.

For carrying out the first step of the shown two-step device trust processing $160_2$, values of environmental parameters are considered and/or packaged into a first set of environmental parameters $128_1$, which first set of environmental parameters are delivered to the CMS. The CMS in turn may store the first set of environmental parameters into trust parameter storage 118. As such, the first set of environmental parameters can be accessed by storage and retrieval module 132. The storage and retrieval module can, for example access trust parameter storage to retrieve the first set of environmental parameters that may be used in content object check processing and/or to any other subsequent device trust processing of any sort.

When the first set of environmental parameters are delivered to the CMS, the CMS might invoke storage and retrieval module 132 so as to access user device history 134 and/or trust parameter storage 118. In some cases, the information contained in user device history 134 and/or trust parameter storage 118 might implicate a particular content object. In such a case, content object event history 136 and/or content object storage116 might be accessed to identify information that might be used in determining a trust level for the device. Moreover, content object event history 136 and/or content object storage116 might be accessed to identify information that might be useful in determining whether to formulate a challenge or whether to send a token 127 to the device.

In some situations, the then-current trust level for the device is deemed to be relatively low, in which case, rather than sending token 127, a challenge 131 is sent to the device and at least some portion of a login/challenge protocol is carried out by and between the user device and the CMS. At some point, possibly after one or more challenges, the CMS system will send a token 127, which token can be used when carrying out messaging to request content object access 124.

There may be some time between the moment a token is generated and the moment of requesting content object access. As such, when carrying out messaging to request content object access 124, a then-current second set of environmental parameters $128_2$ are gathered and sent for content object check processing 164. During the course of content object check processing, the particular content object sought to be accessed, together with a copy of the previously generated instance of token 127, is provided to content object check processing 164. A particular content object access request 122 may refer to (1) a particular content object sought to be accessed (e.g., a file or folder), and/or a particular type of access (e.g., preview a file, edit a file, list contents of a folder, etc.).

When the particular content object access request 122 is received by the CMS at storage and retrieval module 132 the storage and retrieval module may carry out a protocol with any one or more agents that implement content object check processing 164. Additionally, or alternatively, the storage and retrieval module of the CMS may perform and/or initiate performance of acts that facilitate making a determination as to whether to allow (or deny) a particular operation or function of the content management system (e.g., to allow a particular content object to be accessed for carrying out a particular type of access (e.g., preview a file, edit a file, list contents of a folder, etc.) and/or for performing a particular function of the content management system 104.

Any one or more of the shown content object check processing 164 and/or the shown storage and retrieval module 132 may consider the actual content of a sought-to-be-accessed content object. The determination as to whether to allow (or deny) a particular type of access (e.g., preview a file, edit a file, list contents of a folder, etc.) and/or for performing a particular function of the content management system can be made on the basis of aspects of the actual content of a sought-to-be-accessed content object. Strictly as an example, a determination to deny a READ access to a particular file might be made on the basis that the content of the particular file contains information that is deemed to be too sensitive to deliver to a device that is being operated over a network with known vulnerabilities. As another example, a determination to allow (or deny) a READ access to a particular file might be made on the basis that the content of the particular file contains (or does not contain) a watermark.

Continuing with the discussion of FIG. 1B1, and in the case where access is allowed, then content object provisioning module 133 may provide a copy of the content object (or a copy of merely a portion of a content object), together with a copy of the content object metadata 141 (or a copy of merely a portion of a content object metadata) to the requesting user device. The user device may make a content object local copy to use while the device is offline. In some cases, an offline access token is provided to the device (e.g., for access to a particular copy of the content object or for access to a copy of merely a portion of a content object), and such an offline access token may have a validity period or expiration time and/or date.

The foregoing interactions between a user device and a content management system can be monitored on an ongoing basis. Moreover, a history of tracked interactions may be maintained such that aspects of interaction tracking can be (1) stored, and (2) used at any time to inform how to carry out the two-step device trust processing. More specifically, a history of tracked interactions may be combined with information pertaining to or derived from the actual content of a particular one or more content objects.

FIG. 1B2 shows an example configuration of a system 1B200 for allowing or denying e-sign operations based on dynamically determined risk profiles.

The figure is being presented to illustrate how the system of FIG. 1B1 can be modified to make allow/deny determinations when an e-sign event has been raised. As shown, when an e-sign event 121 is received at a user device, that e-sign event can be processed through an implementation of multi-step device trust processing (e.g., multi-step e-signature trust processing 161), which multi-step device trust processing considers additional factors beyond the factors considered in the system of FIG. 1B1. In the example shown, additional processing (e.g., sensitivity level processing 165) is invoked to consider the nature of the e-sign event as well as any documents or other content objects that might be accessible upon carrying out operations underlying the e-sign event.

Furthermore, the system of FIG. 1B2 can be modified to ingest and act on any externally sourced risk profiles (e.g., third party user/device risk profiles 166). Thus, as can be seen, the integrity of the subject e-sign process is hardened against compromise by malaprops. This is of particular importance since a user who is a signatory or other participant in an e-sign process need not necessarily be a user of the CMS. It should be noted that the CMS might not, by itself, have sufficient information to assess threat levels that correspond to the non-CMS user's device or prior history. As such, and as shown, the CMS can ingest any one or more third party user/device risk profiles, which third party user/device risk profiles might include information pertaining to hardening against a non-CMS user and/or the third party user/device risk profiles might include information pertaining to hardening against the non-CMS user's devices.

Such hardening can be facilitated by blocking access to CMS data (e.g., user device history 134 and/or trust parameter storage 118 and/or content object event history 136 and/or content object storage116, etc.). Additionally, such hardening can be facilitated by the analysis and determinations of the shown sensitivity level processing 165. In some cases, the CMS has sufficient information about a particular user or user device or user behavior that causes the CMS to raise a threat level. Strictly as examples, the CMS detect spoofing (e.g., by detecting impossible travel between geographic locations) and the CMS can identify anomalous downloads.

Details regarding general approaches to identifying spoofing are described in U.S. application Ser. No. 16/553,106 titled "AVOIDING USER SESSION MISCLASSIFICATION USING CONFIGURATION AND ACTIVITY FINGERPRINTS" filed on Aug. 27, 2019, which is hereby incorporated by reference in its entirety.

Details regarding general approaches to identifying anomalous downloads are described in U.S. application Ser. No. 16/948,779 titled "DETECTING ANOMALOUS DOWNLOADS" filed on Sep. 30, 2020, which is hereby incorporated by reference in its entirety.

As can be seen, the occurrence of an e-sign event 121 invokes further processing to request e-sign operation authorizations 125, which might in turn invoke sensitivity level processing 165. The sensitivity level processing might result in generation of an e-sign token 137 or, the sensitivity level processing might result in generation of a challenge. A challenge can be generated any time that the sensitivity level processing deems that there is some risk that is not sufficiently mitigated unless the challenge is surmounted by the user (e.g. at or by the user device).

As used herein, the term "e-sign" and the term "e-signature" are interchangeable.

Now, returning to the discussion of how the system of FIG. 1B2 ingests and acts on any externally sourced risk profiles (e.g., third party user/device risk profiles 166), it should be noted that there exists situations where a determination to block access can be made solely on the basis of a particular risk profile (e.g., is the user is deemed to be a known malaprop). On the other hand, there exists situations where a determination to allow certain access can be made solely on the basis of the content object being accessed (e.g., when a workflow object is being read) in spite of any particular risk profile. As such, in this embodiment, the storage and retrieval module 132 is configured with both a blocking module 172 and a grant module 174.

The foregoing mechanisms for hardening e-signature acquisition can be implemented in any environment using any system components in any interconnection. An example environment in which an e-signature acquisition system that uses dynamically determined risk profiles when making allow-deny decisions is shown and described as pertains to FIG. 1C.

Figure 1C:
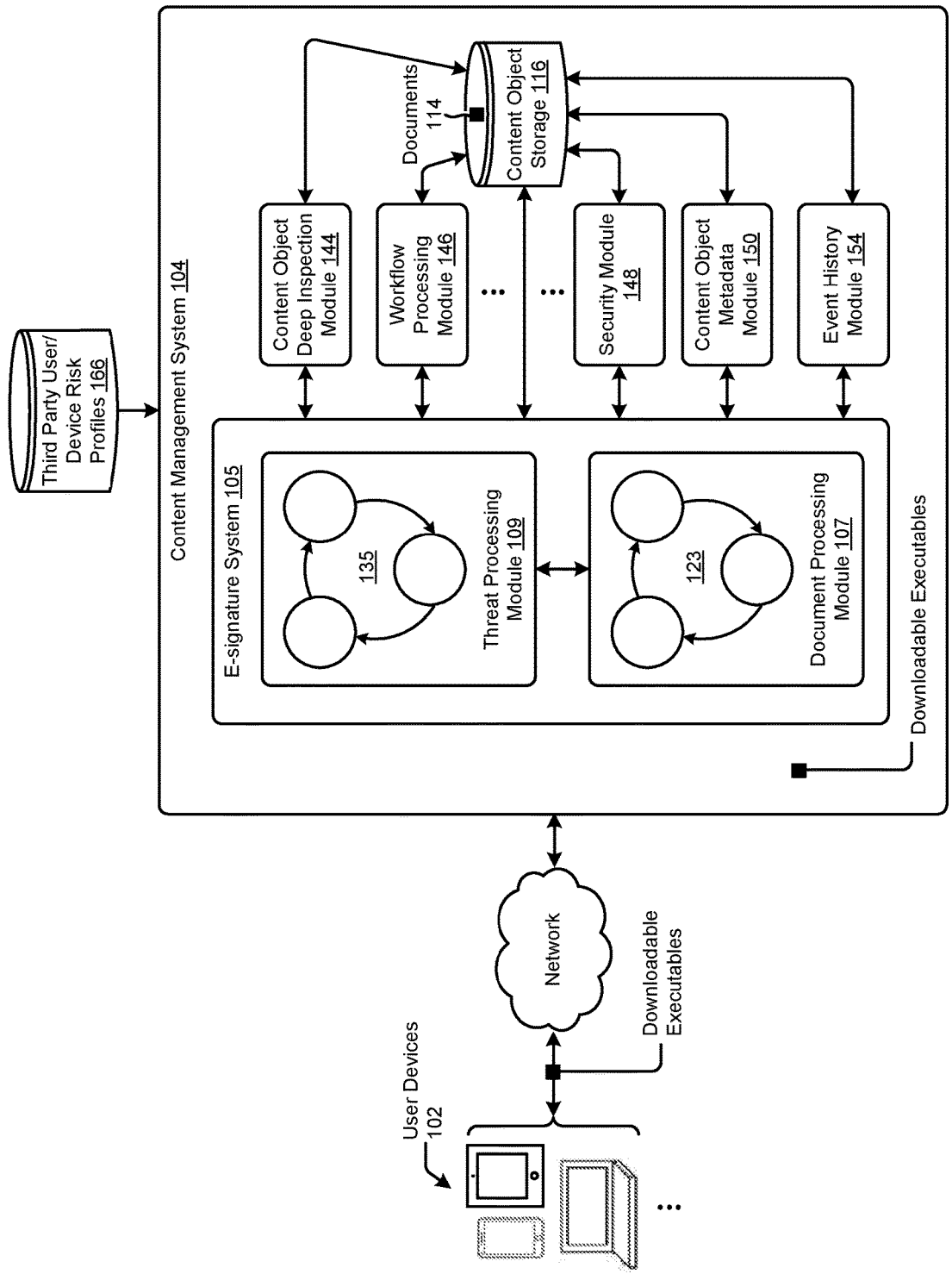
FIG. 1C shows an example configuration of an e-signature system that allows or denies e-signature processing based on signatory trust levels and/or device trust levels, according to an embodiment.

FIG. 1C shows an example configuration of an e-signature system that allows or denies e-signature processing based on signatory trust levels and/or device trust levels. In this embodiment, the shown e-signature system 105 (ESS) is composed of executables that are situated within content management system 104. As such, e-signature system 105 can interface directly with any of the modules (e.g., content object deep inspection module 144, workflow processing module 146, security module 148, content object metadata module 150, event history module 154) of the content management system. In some cases, e-signature system 105 can have direct access to documents 114 of content object storage 116.

User devices 102 interact with the e-signature system 105 over/through a network, as shown. In some embodiments, e-signature system 105 hosts downloadable executables that can be loaded onto any of a variety of user devices (e.g., smart phones, tablets, laptops, etc. such as shown). The user devices can be configured to execute portions of the downloadable executables so as to interact with the content management system and/or the e-signature system. In some cases, the user devices execute the downloadable executables so as to interact with document processing module 107 and/or threat processing module 109. The threat processing module 109, can in turn access any module of the CMS and/or any document 114 of the CMS. Furthermore, the e-signature system and/or the content management system can host additional executable modules that implement at least a portion of an Internet-based interface. For example, the e-signature system 105 and/or the content management system 104 can host additional executable modules that are downloadable to a user device. As such, once applicable executable modules have been downloadable to a user device, the user device can perform any functions provided by the ESS or CMS. In some cases, functions provided by the ESS or CMS are codified in the downloadable executable modules for execution on a user device. In some cases, functions of the ESS or CMS are accessed by a user device by carrying out a communication exchange over the network.

Any combination of interactions between the user devices and the content management system, and/or any interactions between the user devices and the e-signature system, and/or any interactions between any of the constituent modules of the CMS may be carried out in any order. Moreover, any combination of interactions between modules of the CMS and modules of the ESS may be carried out in any order. To accommodate flexible multi-module data gathering and processing by and between modules of a CMS and/or by and between a CMS and an ESS, one or more event-driven systems may be implemented. In one embodiment, a CMS implements a document processing state machine 123 that handles events pertaining to document access and/or retrieval. Also, in one embodiment, an ESS implements a threat processing state machine 135 that handles events pertaining to e-signature processing.

The foregoing state machines can execute asynchronously, possibly sharing information between the threat processing module and the document processing module. Moreover, it can happen that new, dynamically determined threats can be uncovered by either (or both) of the threat processing module and the document processing module. In some such cases, new, dynamically determined threats can be forwarded to one or more third party application for consideration. Such dynamically determined threats might be processed by the third party in a manner that results in new risk profiles being generated and/or such dynamically determined threats might be processed by the third party in a manner that results in modification of pre-existing risk profiles.

Any particular content management system operation and/or any particular e-signature system operation can be allowed or denied based on trust levels. Methods for allowing or denying access to content management system data based on (1) content-based device trust levels, and/or based on (2) e-signature-specific trust levels as shown and described as pertains to FIG. 2A and FIG. 2B, respectively.

Figure 2A:
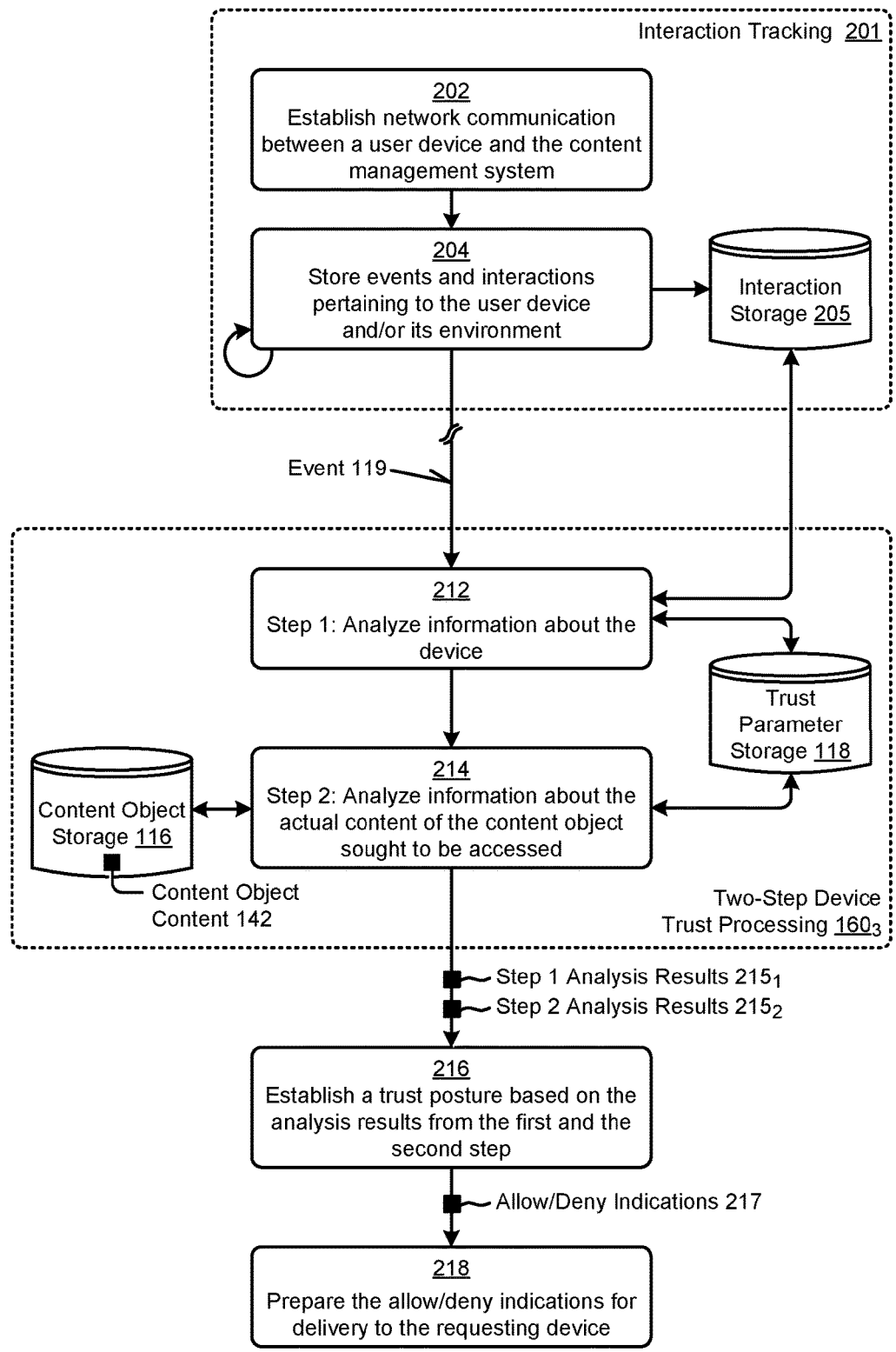
FIG. 2A is a flowchart showing steps used in systems for allowing or denying access to content management system data according to content-based device trust levels, according to an embodiment.

FIG. 2A is a flowchart 2A00 of steps used in systems for allowing or denying access to content management system data according to content-based device trust levels. As an option, one or more variations of flowchart 2A00 or any aspect thereof may be implemented in the context of the architecture and functionality of the embodiments described herein and/or in any environment.

The figure is being presented to show how a flow can be carried out in an example environment. The shown flow includes ongoing activities of interaction tracking 201 that can be carried out concurrently with processing of event-driven operations 129. The observation and storage of interactions between a user device and a content management system (e.g., step 204 of the shown ongoing interaction tracking 201) can be carried out asynchronously with processing of event-driven operations 129. More specifically, responsive to establishing network communication between a user device and the CMS (step 202), any interactions pertaining to the user device and its environment, and/or interactions pertaining to the user device and the CMS, can be observed and recorded on an ongoing basis (step 204).

Strictly as examples, interactions pertaining to the user device and its environment may include or pertain to (1) changes in networking security policies, and/or (2) changes in the software and/or hardware configuration of the user device (e.g., due to a software patch or replacement, etc.), and/or (3) changes in the authentication certificate used to securely authenticate a user or user device, and/or (4) other changes in the user device and its environment. Further, and again, strictly as examples, interactions (e.g., requests, accesses, uploads, downloads, etc.) between the user device and the CMS may include or pertain to (1) login attempts, and/or (2) content object access requests, and/or (3) content object editing or deletion, and/or (4) other interactions between the user device and the CMS.

Any or all observed interactions pertaining to the user device and its environment, and/or any or all interactions between the user device and the CMS can be stored (e.g., in interaction storage 205) for subsequent retrieval. In some implementations, interactions pertaining to the user device and its environment are classified as a change event, however in other implementations, interactions pertaining to the user device and its environment are classified fuzzy changes, that are considered at a later moment in time, possibly in conjunction with additional information. Strictly as one example, a fuzzy change might correspond to a change in a hardware or software configuration of a user device. As such, even though the device itself in toto had not changed, the configuration or "fingerprint" of the device had changed in a manner that would at least potentially be considered in determining device trust.

At any moment in time, an event 119 may be raised. As shown, such an event (e.g., an event raised by a user device) can be routed to one or more operational elements that comprise two-step device processing. More specifically, responsive to the occurrence of the event, two-step device trust processing 1603 can be invoked such that step 1 of the two-step device trust processing (e.g., process 212) and step 2 of the two-step device trust processing (e.g., process 214) are carried out (e.g., in a sequence, or in parallel, or partially in parallel and partially in a sequence). In the example shown, step 1 of the two-step device trust processing (i.e., analyze information about the device) completes before initiation of step 2 of the two-step device trust processing (i.e., analyze information about the content being requested). In this embodiment, step 1 of the two-step device trust processing makes a certain set of trust determinations based on previously observed interactions (e.g., as stored in interaction storage 205).

The results of making such trust determinations are captured as values that are associated with aspects of the device and its environment, which aspects of the device and its environment serve to inform trustworthiness of a particular device at a particular moment in time. Such values that are associated with aspects of the device and its environment are stored as values in trust parameter storage 118. Any entry in the trust parameters may be associated with a particular device as well as a time stamp of when the corresponding trust determination values were retrieved or calculated. Any of the then-current values found in trust parameter storage 118 are available to step 2 of the two-step device trust processing. Step 2 of the two-step device trust processing performs analysis based on then-current values of trust parameters that are considered in conjunction with gathered information pertaining to the actual content of a sought-after content object.

To illustrate the foregoing, consider a scenario where a device requests a download of a file "Hidden.xls". Further consider in this scenario that step 1 determines that the requesting device is connecting through an IP address that is known to be associated with known malefactors (e.g., situated in a sovereign state that is known to be associated with password hack perpetration). Still further, consider that inspection of the contents of the file "Hidden.xls" might determine that the file contains sensitive information (e.g., passwords, password hashes, or other personally identifiable information). In this scenario, it is the combination of the IP address being associated with known malefactors together with the determination that the file contains sensitive information that leads to the requested download being denied. The foregoing is merely one scenario. A multitude of other scenarios abound where aspects of the actual contents of a sought-after content object is used in combination with aspects of the requesting device, which is then used in further analysis that leads to an "allow" or "deny" determination.

In the example embodiment of FIG. 2A, the results of the two-step device trust processing are emitted as step 1 analysis results $215_1$ and step 2 analysis results $215_2$. These results are provided to downstream processing, the execution of which downstream processing results in an allow/deny determination. As shown, downstream processing includes establishment of a trust posture (process 216) based on the results of the two-step device trust processing. A trust posture may include a numeric value on a scale (e.g., a probability of a future occurrence), or a trust posture may include a plurality of allow/deny indications 217 that correspond to a respective plurality of possible operations that could prospectively be applied over a content object. In some cases, a trust posture may include a binary 1/0 or a binary allow/deny indication to apply to the then-current request.

Further downstream processing (e.g., step 218) determines whether or not, and how to respond to the requesting device. In some cases, a reply is suppressed such that no response is provided to the requesting device. In other cases, the foregoing allow/deny indications are prepared for delivery to the requesting device.

Now, returning to the discussion of event 119 that invokes event-driven operations 129, in addition to the scenario where event 119 is raised by a user device, there are cases where event 119 is raised by an occurrence in the CMS. In this situation, any/all portions of process 214 to analyze information about the actual content of a particular content object can be executed in advance of a request from a device so as to facilitate rapid generation of the step 2 analysis results.

Strictly as examples, an occurrence that corresponds to event 119 can happen when a label applied to a content object changes (e.g., due to changes in the actual content of the content object or due to changes in the content object metadata of the content object). Additionally, or alternatively, an occurrence that corresponds to event 119 can happen when a content object is newly shared and/or when a collaboration group corresponding to the content object is modified (e.g., to include or exclude other collaborators, and/or to change the role or roles of any of the listed collaborators). Additionally, or alternatively, an occurrence that corresponds to event 119 can happen when a preview request is promoted to a download request, and/or when a content object is deemed to contain malware (e.g., ransomware or 'bots', etc.). In some cases, a document signing event (e.g., an e-sign event raised by a user operating a particular device) may raise an occurrence of event 119 that in turn initiates execution of all or portions of event-driven operations 129.

The foregoing event-driven operations and processing thereto can be specific to e-signing operations. Some examples of e-sign event processing are shown and described as pertains to FIG. 2B.

Figure 2B:
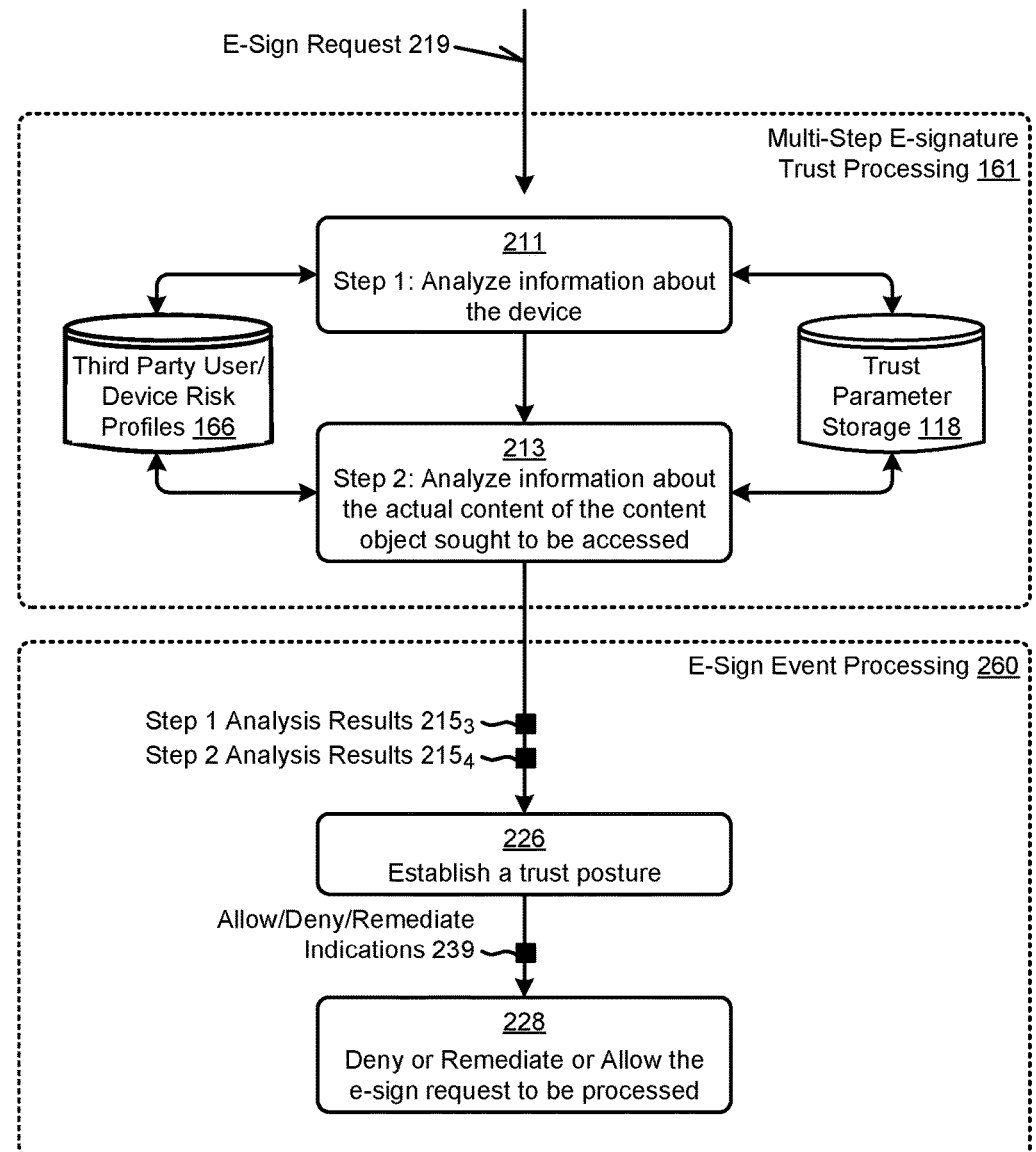
FIG. 2B shows a flowchart including steps used in systems for allowing or denying provision of e-signatures based on dynamically determined user/device risk profiles, according to an embodiment.

FIG. 2B shows a flowchart 2B00 including steps used in systems for allowing or denying provision of e-signatures based on dynamically determined user/device risk profiles. The figure is being presented to illustrate how an e-sign event can be processed through multi-step e-signature trust processing in a manner that facilitates hardened processing of e-signatures.

As shown, when an e-sign event is raised such as via e-sign request 219, the occurrence of that event and/or any information pertaining to the e-sign request (e.g., the request itself) is routed to one or more operational elements that comprise the multi-step e-signature trust processing 161. Such multi-step e-signature trust processing can be invoked such that step 1 of the multi-step e-signature trust processing (e.g., process 211) and step 2 of the multi-step e-signature trust processing (e.g., process 213) are carried out (e.g., in a sequence, or in parallel, or partially in parallel and partially in a sequence) to make a set of trust determinations.

The results of making such trust determinations are captured as values that are associated with aspects of the device and its environment, which aspects of the device and its environment serve to inform trustworthiness of a particular device at a particular moment in time. In some embodiments, such as the embodiment of FIG. 2B, risk profiles that are associated with aspects of the device and its environment are stored in or in conjunction with third party user/device risk profiles 166. Any entry in the risk profiles may be associated with a particular device as well as a time stamp of when the corresponding risk profiles were retrieved or calculated. Then-current values of third party user/device risk profiles 166 are available to step 2 of the multi-step e-signature trust processing. Step 2 of the multi-step e-signature trust processing performs analysis based on the then-current values of any risk profiles that are in turn considered in conjunction with gathered information pertaining to allowing or denying processing of the operations that underly the e-sign request.

In the example embodiment of FIG. 2B, the results of the two-step device trust processing are emitted as step 1 analysis results 2153 and step 2 analysis results 2154. These results are provided to downstream processing (e.g., the shown e-sign event processing 260), the execution of which downstream processing results in allow/deny/remediate indications 239, possibly followed by further downstream processing.

In this example embodiment, downstream processing first establishes a trust posture (process 226) based at least in part on the results of the two-step device trust processing. A trust posture may include a numeric value on a scale (e.g., a probability of a future occurrence). Operations that establish a trust posture may in some cases include one or more allow/deny/remediate indications 239 that correspond to a respective one or more possible operations that could be involved in the e-sign processing.

Still further, downstream processing (e.g., decision 228) determines whether or not and how to respond to the requesting device. In certain cases when a reply is denied, no response is provided to the requesting device. This is because there are situations where the requesting user or the requesting user device, or the network over which the request is made, might be deemed suspicious. In some situations, even a reply of any kind might provide information that a malaprop can use for malicious purposes. In such situations, no response is provided to the requesting device.

In some cases, a reply is subjected to one or more forms of remediation such that, after remediation has been confirmed, the requesting device can participate in the e-signing process in spite of a low trust posture. In other cases, the request is allowed and further instructions are prepared for delivery to the requesting device.

In some scenarios, remediation might be in the form of further processing that requires the user to respond to a request to take some specific confirming actions (e.g., requesting the user to take a photo and upload, requesting the user to provide further authentication credentials under a multi-factor regime, requiring the requesting user to provide one or more fingerprint biometrics or face biometrics or other biometrics, etc.) so as to perform and/or augment (e.g., harden) one or more forms of knowledge-based authentication. In other scenarios, remediation might take the form of re-routing or re-directing network traffic to avoid a suspicious network segment. In still other scenarios, remediation might take the form of re-routing the e-signature request to a proxy or deputy for the e-signatory.

It can also happen that remediation takes the form of forcing an action at the user device. For example, in cases where the CMS controls at least a portion of the contents (e.g., executable code on the user device and/or data on the user device) of memory (e.g., volatile memory or non-volatile memory) of the user device, the CMS can invoke one or more remote-controlled deletions or "wipe" operations. In some such cases, the entire contents of all memory that is controlled by the CMS is deleted and/or overwritten with zeros or random data. Still further, as an example of forcing an action at the user device, the CMS can cause the user device to log out.

Further details regarding general approaches remote-controlled deletions are described in U.S. Pat. No. 11,423,167 titled "SECURE CONTENT LEAKAGE PREVENTION" issued on Aug. 23, 2022, which is hereby incorporated by reference in its entirety.

As is presently understood, it is possible that a document to be e-signed might have only one signatory (e.g., signing an authorization for a funds transfer). It is also possible that a document needs to be e-signed by multiple signatories, each of whom might have a corresponding signatory-specific risk. A system for gathering information pertaining to one or more signatories is shown and described as pertains to FIG. 2C. More specifically, FIG. 2C presents a processing flow that can be used when considering adaptive risk tolerance thresholds for multiple signatories.

Figure 2C:
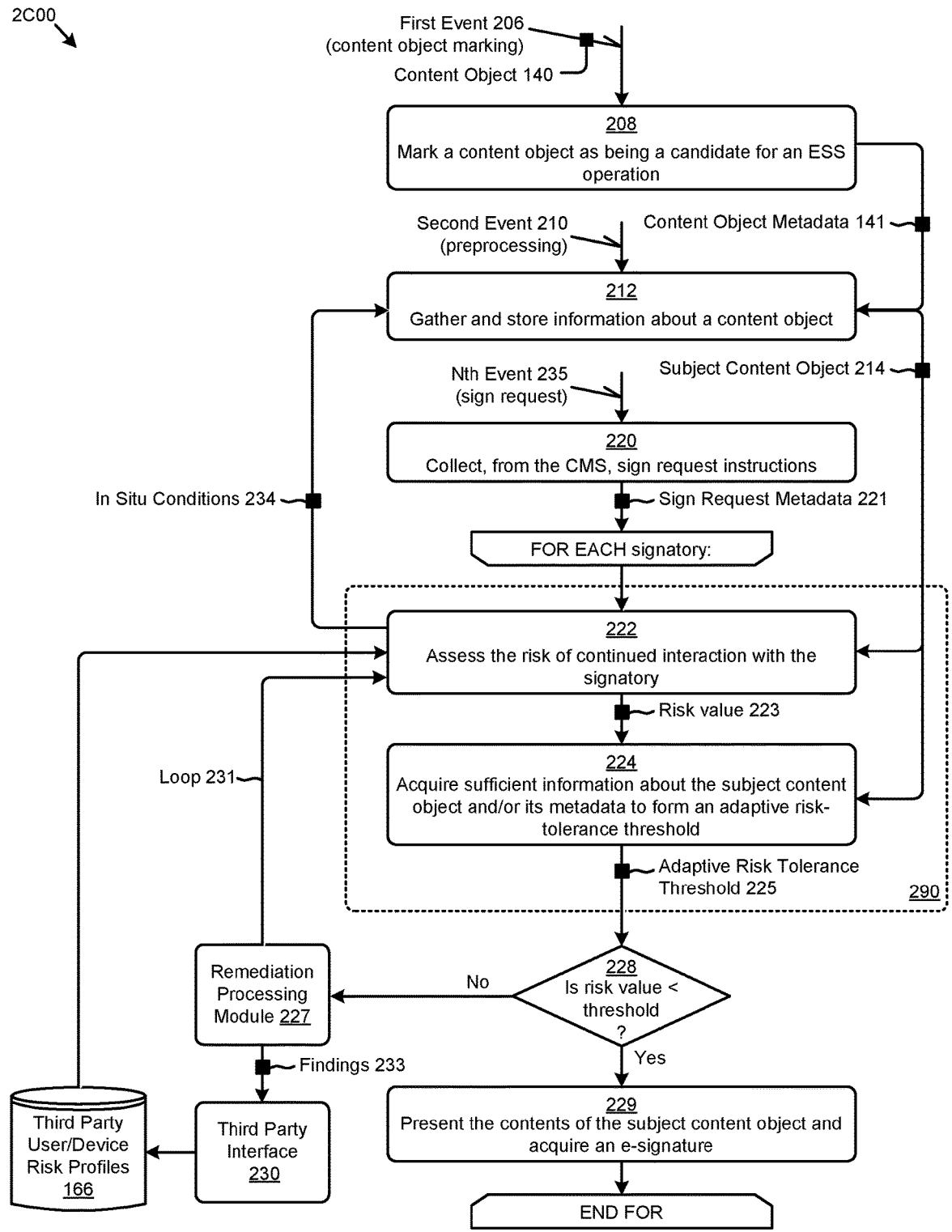
FIG. 2C shows a flowchart including ongoing operations as may be carried out in an e-signature system for acquiring e-signatures based on adaptive risk tolerance thresholds, according to an embodiment.

FIG. 2C shows a flowchart including ongoing operations 2C00 as may be carried out in an e-signature system 105 for acquiring e-signatures based on adaptive risk tolerance thresholds 275.

The figure is being presented to illustrate coordination between multiple asynchronous processes (e.g., process 208, process 212, process 220, etc.) such that a then-current risk can be compared to a then-current adaptive risk-tolerance threshold. Additionally, the figure is being presented to illustrate how risk might be remediated for a given signatory.

As shown, process 208 is configured to be responsive to a content marking event (e.g., first event 206). Any process from within the CMS or from outside the CMS might raise such an event. Process 208 serves to consider a subject instance of content object 140. Such a subject instance of content object might become a candidate for an ESS operation by operation of a e-signature system workflow. Alternatively, a subject instance of a content object might become a candidate for an ESS operation by the mere raising of an e-sign request, whether or not there is any e-signature system workflow involved. Possible outcomes from performance of process 208 include association of a particular e-sign request with the content object. In some cases, and as shown, one outcome from performance of process 208 is emission of content object metadata 141 that indicates an association of the subject content object to the e-sign request. Such content object metadata 141 can be provided to other processes.

In particular, process 212 can use the content object metadata 141 as a hint as to how to gather and store information about the content object. As shown, process 212 operates asynchronously with respect to the other processes of FIG. 2C. More particularly, process 212 might be invoked by occurrence of a preprocessing signal or event (e.g., second event 210). Such a preprocessing signal might be raised by any operational element at any point in time. In the shown set of ongoing operations 2C00, such a preprocessing signal might be raised concurrently with, or in response to, occurrence of an incoming sign request (e.g., Nth event 235).

In the example system of FIG. 2C, process 220 is configured to respond to an occurrence of a sign request by collecting, from the CMS, all or substantially all of the full set of information needed to process a sign request. In particular, process 220 is configured to determine the full set of signatories involved in the sign request. As can be presently understood, there may be multiple signatories for any particular document. Moreover, each signatory, whether considered by virtue of their person or whether considered with respect to their device and/or networking environment, poses signatory-specific risks, and each signatory-specific risk needs to be considered with respect to an adaptive risk tolerance threshold. Accordingly, a FOR EACH loop over each signatory is entered.

As a first step within the FOR EACH loop, risks associated with a particular signatory are considered (step 222) and a risk value 223 is emitted. In subsequent processing, that risk value is used in conjunction with an adaptive risk tolerance threshold to determine whether or not to proceed with steps involved in obtaining an electronic signature. To explain, consider that it is usually necessary to present the contents of a content object to a signatory in order to obtain the signature. That is, the signature is used to indicate that the signatory has seen the contents of the document to be signed, and that the signatory agrees with its contents. Now, further consider the case where a given user device and/or the network or network path that is between the user device and the ESS has been deemed to be suspicious or otherwise not completely safe. In such a situation, it can happen that proceeding with presentation of all or part of the contents of the to-be-signed content object has the potential for leakage.

The overall risks involved in such leakage depend substantially on the sensitivity of the contents of the content object. As an example, a document that is marked (e.g., via metadata) as "TOP SECRET" might be deemed to present a high risk if the "TOP SECRET" portions were misappropriated. On the other hand, as a contrasting example, a document that is marked (e.g., via metadata) as merely "INTERNAL" might be deemed to present a low risk even if portions of the to-be-signed document were misappropriated. Accordingly, the determination as to whether or not to proceed with the e-sign process has to do with the combination of risk and a risk threshold. A risk threshold may be adaptive. That is, a risk threshold might be decreased if the to-be-signed document is deemed to be not very important, whereas a risk threshold might be increased if the to-be-signed document is deemed to be highly important.

Continuing the discussion of the FOR EACH loop of FIG. 2C, step 222 may be informed by any available sign request metadata 221 and content object metadata 141, whether considered singly or in combination. Such consideration (e.g., by operation of step 222) results in a numeric risk assessment (e.g., risk value 223). Such a risk value determination is made by considering the totality of in situ conditions 234. In some cases, the totality of in situ conditions 234 includes whatever in situ conditions can be determined based on or inferred from third party user/device risk profiles 166.

There are a large number of potential providers of risk profiles, including Crowdstrike, Qualys, Okta, to name but a few. Table 1 is presented to characterize just a few examples of entries (e.g., entries composed of signals, parameters, and values), that derive from but a few of the providers of risk profiles.

TABLE 1

| Types of Risk Profile Entries] | |
|---|---|
| Entry Type | Semantics |
| Endpoint Assessment | Number of time and/or severity of threats involving the dotted quads |

TABLE 1-continued

Types of Risk Profile Entries]

| Entry Type | Semantics |
|---|---|
| Attacker Activities | Known activities such as access to proprietary data, denial of service, promulgation of malware, success rate of ransomware attacks, etc. |
| Adversarial Tactics | Occurrences of spoofing, phishing, man-in-the-middle packet interception |
| Threat History | Summary of timestamped attacks and details of attacks |
| Threat Attribution | Identification of the attacker by URL or endpoint or certificate |
| Adversarial Tradecraft | Signature of the attacker by any known method of attribution |
| Virility Score | Relative assessment of the strength of a particular threat |
| Hardened Score | Relative assessment of the hardening of a known endpoint |

Any particular entry can include any number of signals, parameters, and values, any of which can be presented (e.g., via an application programming interface) in any order or priority or combination. Further, a risk potential determination can be made either by combining multiple signals, parameters, or values drawn from a single provider, or by combining a first set of one or more signals, parameters, and values from a first provider with a second set of one or more signals, parameters, and values drawn from a second provider Once a risk potential determination has been made (e.g., resulting in emission of risk value 223) then that risk value can be retained for later comparison with an adaptive risk tolerance threshold. Such an adaptive risk tolerance threshold 225 can be based, in whole or in part, on the sensitivity of the contents of the subject content object. As shown, step 224 serves to acquire sufficient information about the subject content object and/or its metadata to form an adaptive risk tolerance threshold 225. If the risk is deemed to be less than the risk tolerance threshold (decision 228), then it is deemed to be sufficiently safe (the "YES" branch of decision 228) to provide all or portions of the contents of the subject content object to the particular signatory and acquire an e-signature (step 229).

On the other hand, if it is not deemed to be safe, then the "No" branch of decision 228 is taken and none of the contents of the subject content object are presented to the particular signatory. Instead, remediation is attempted (e.g., via remediation processing module 227). In some situations, remediation processing is able to reduce risks of continued interaction with the signatory. In such cases, the flow returns to step 222 via loop 231 such that the operations of step 222 can once again assess the risk of continued interaction with the particular signatory. In some cases, additionally or alternatively to returning to step 222 via loop 231, a third party interface 230 is accessed so as to provide findings 233 to the corresponding third party. The findings may be codified, in whole or in part, into the third party user/device risk profiles 166.

Returning to the discussion of step 224, any known mechanism can be used to form an adaptive risk tolerance threshold 225. In some cases, a risk tolerance value can be drawn from a mapping or projection of a normalized sensitivity level (e.g., having numeric values from 0 to 100) onto a risk tolerance spectrum (e.g., also having numeric values from 0 to 100). An example implementation of such a mapping is shown and described as pertains to FIG. 2D.

Figure 2D:
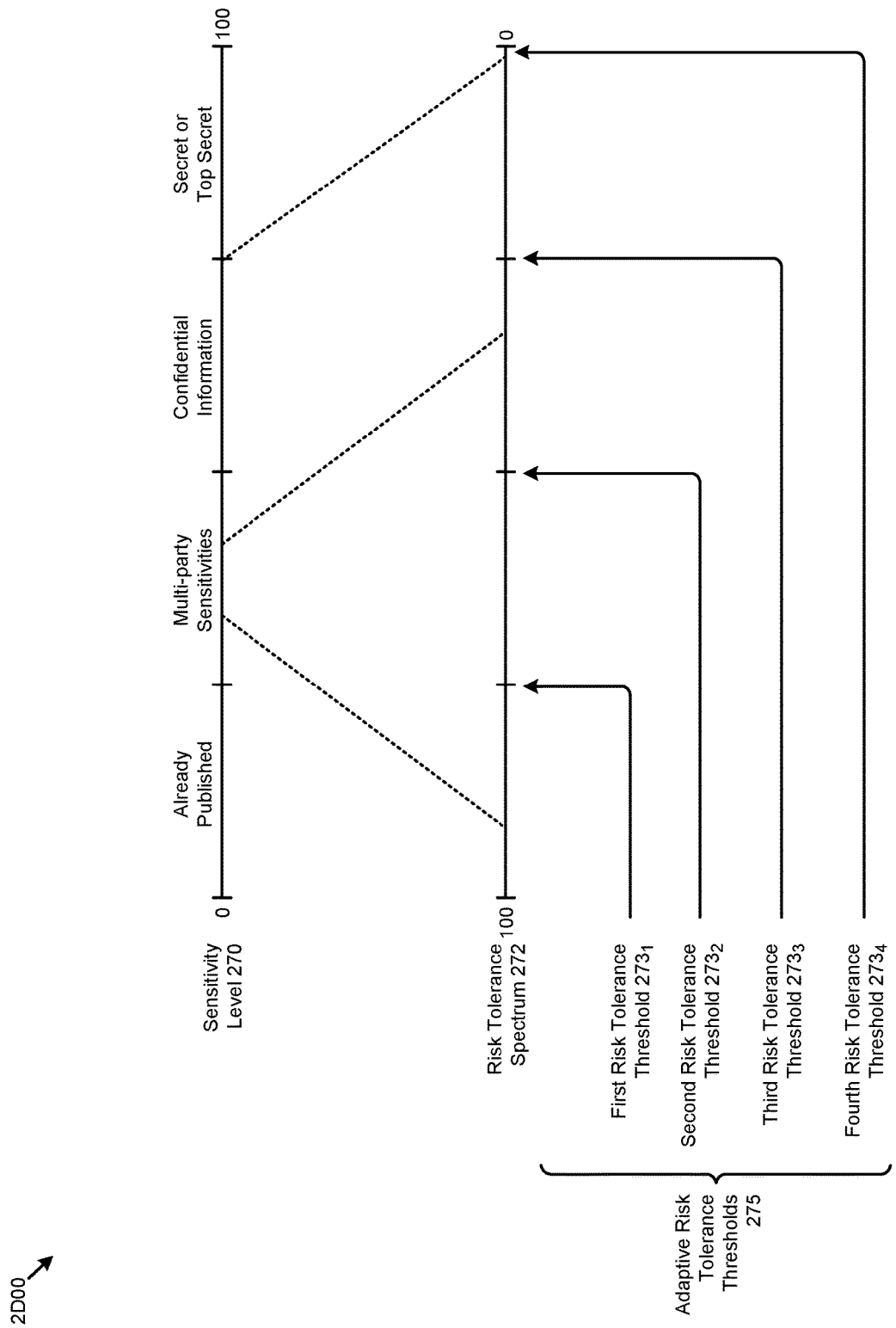
FIG. 2D presents a graph that shows a mapping of sensitivity levels onto a risk tolerance spectrum as used in systems for allowing or denying provision of e-signatures, according to an embodiment.

FIG. 2D presents a graph that shows a mapping 2D00 of sensitivity levels onto a risk tolerance spectrum as used in systems for allowing or denying provision of e-signatures.

As mentioned heretofore, a risk tolerance value can be used when determining whether or not to permit an e-signing process to continue. To further explain, it can happen that the decision as to whether or not a given e-signing process (or portion thereof) should be allowed to continue can be influenced by multiple factors, and these multiple factors can be considered together. For example, consider an e-sign request that seeks e-signatures that signify agreement to a very sensitive "TOP SECRET" pact between (for example) two government agencies. The risk of leakage or misappropriation is very high, therefore, even a small amount of uncertainty regarding the environment (e.g., network, user device or devices, location of endpoint, etc.) and/or even a small amount of uncertainty that the intended recipient is in fact the actual recipient would be enough to prevent the e-signing process to continue.

As a different example on the opposite end of the sensitivity spectrum, consider a modern-day e-signing of a birthday card. In this situation, the risk tolerance is very high. That is, the risk of misappropriation of the content by any signatory—even if the intended signatory is being spoofed—is very low. Therefore, in accordance with practices contemplated by this disclosure, this would mean that access to the birthday card can be provided to a signatory even if there is a large amount of uncertainty whether or not the intended recipient is in fact the actual recipient, and/or even if there is a large amount of uncertainty as to the security of the infrastructure over which the birthday card (or portion thereof) is delivered.

The foregoing are merely illustrative examples that span a range or spectrum of sensitivities of subject content. There can be a wide range of sensitivity levels of content objects, and there can be a wide range of trust levels applied to infrastructure or environmental conditions. To accommodate, there needs to be some mechanism for dealing with a wide range of sensitivity levels of content objects in combination with a wide range of trust levels applied to infrastructure or environmental conditions. One possible way to deal with such a wide range of sensitivity levels of content objects in combination with a wide range of trust levels applied to infrastructure or environmental conditions is to map sensitivity levels to a risk tolerance spectrum, and then to compare the mapped-to risk tolerance with risk that is observed or imputed onto the infrastructure or environmental conditions.

FIG. 2D presents a graphical depiction of such a mapping 2D00. As shown, a sensitivity level range 270 goes from a sensitivity level of 0 to a sensitivity level of 100, where a higher value corresponds to a higher sensitivity level. Various monikers (e.g., "Already Published," "Top Secret," etc.) are associated with subranges of the sensitivity level range. These subranges are mapped onto a risk tolerance spectrum 272 that goes from 100 to 0. Any particular subrange of sensitivity level of a document (e.g., sensitivity level of contents of a content object) can be mapped to any subrange of risk tolerance. The size of the subranges need not be the same. For example, all documents that are marked (e.g., via metadata) as being "Secret" or "Top Secret" (e.g., corresponding to sensitivity level range from 90 to 100) can be mapped to a very small subrange of risk tolerance.

A mapping such as that shown in FIG. 2D can be used to define risk tolerance thresholds, and such risk tolerance thresholds can in turn be used in determining whether or not to not to permit an e-signing process to continue. Such risk tolerance thresholds can be assigned based on an enterprise or organization. For example, an IT department of a Fortune 1000 company might apply a lower risk tolerance threshold (e.g., risk tolerance threshold 2734) to its Finance Department, whereas the same IT department might apply a higher risk tolerance threshold (e.g., risk tolerance threshold 2731) to its Community Outreach Department. There can be any number of risk tolerance thresholds defined (e.g., risk tolerance threshold 2732, risk tolerance threshold 2733).

Any operation that involves presentation of all (or a portion of) a content object can be allowed or denied based on the risk tolerance threshold as compared with the then-current calculated risk. One way to assess a calculated risk is shown and described as pertains to FIG. 4E.

Figure 2E:
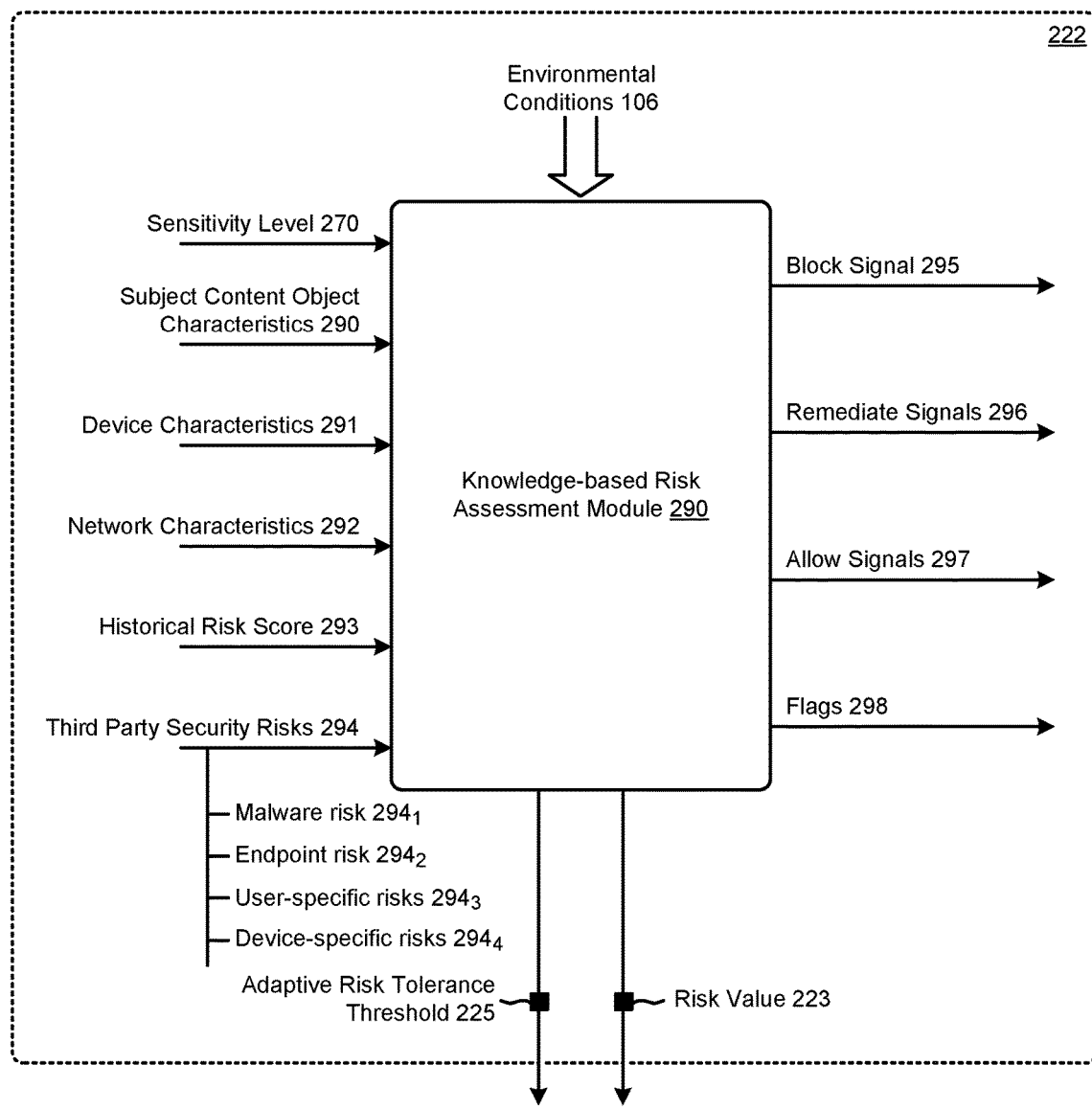
FIG. 2E shows an example knowledge-based risk assessment module as used in systems for allowing or denying advance of e-signature processes based on dynamically determined user/device risk profiles, according to an embodiment.

FIG. 2E shows an example knowledge-based risk assessment module 2E00 as used in systems for allowing or denying advance of e-signature processes based on dynamically determined user/device risk profiles, according to an embodiment.

One or more instances of a knowledge-based risk assessment module might be deployed to perform all or portions of step 222 and step 224 of FIG. 2C. More specifically, and as shown, knowledge-based risk assessment module 2E00 can be configured to output risk value 223 as well as to output one or more occurrences of adaptive risk tolerance threshold 225. In certain embodiments, knowledge-based risk assessment module 2E00 can be implemented as configured to use a machine learning model. In situations where the knowledge-based risk assessment module is configured to use a machine learning model, the model can be trained, at least in part, based on historical data. Nonlimiting examples of inputting historical data into a machine learning model can include use of content object event history 136 (shown in FIG. 1A), user device history 134 (shown in FIG. 1A), user history 355 (shown in FIG. 3B), user authentication history, and/or certificate history 341 (shown in FIG. 3B). Training of the machine learning model can be supervised (e.g., where certain outputs are labeled by an expert) or training of the machine learning model can be unsupervised (e.g., where certain outputs are labeled based on corroborating information drawn from third party corpora). In some implementations, such as shown, the knowledge-based risk assessment module can output many types of output signals (e.g., block signal 295, remediate signals 296, allow signals 297, and/or flags 298). In some cases each type of output signal is an output from a type-specific machine learning model.

The semantics of the foregoing output signals might include conditional terms. For example, any one or more of the shown allow signals 297 might include the semantic of "allow the operation only after successful remediation". Similarly, any one or more of the shown block signals 295 might include the semantic of "block the operation unless there is an currently-enabled override rule".

In the specific example as shown in FIG. 2E, knowledge-based risk assessment module 2E00 ingests multiple input signals. Strictly as nonlimiting examples, the knowledge-based risk assessment module can ingest (1) signals pertaining to the sensitivity of the subject content object (e.g., sensitivity level range 270), (2), signals pertaining to inspection of a particular content object (e.g., subject content object characteristics 290), (3) signals pertaining to any one or more devices that are involved in computerized communication (e.g., device characteristics 291), (4) signals pertaining to any one or more network segments that are involved in computerized communications (e.g., network characteristics 292), and/or (5) signals pertaining a history of risks that were previously ascribed to the subject content object (e.g., historical risk score 293). Further, in embodiments where a third party is consulted in the context of risk assessment, information or signals from such a third party (e.g., third party security risks 294 and/or historical risk scores as maintained by a third party) can be included in the risk assessment. More specifically, in embodiments where a third party is consulted in the context of risk assessment, information or signals (e.g., malware risk $294_1$, endpoint risk $294_2$, user-specific risks $294_3$, and/or device-specific risks $294_4$) from such a third party can be used to generate not only a risk value, but also an adaptive risk tolerance threshold.

A risk value of a particular subject content object can change over time. To explain, consider that at one moment in time, a particular content object might be considered to introduce high risk due to a determination that the content object contains malware of a particular signature. However, at a later moment in time, that malware with that signature might be deemed to be benign. As such, it can happen that a particular subject content object might initially be associated with high risk, but then, at a later moment in time, that same particular subject content object might be considered to introduce only a low risk.

Certain techniques for dynamically determining risk profiles when making allow-deny decisions can be implemented by means of communication protocols that are carried out between the content management system and a device that seeks to access content of the content management system. Example communication protocols are shown and discussed as pertains to FIG. 3A and FIG. 3B.

Figure 3A:
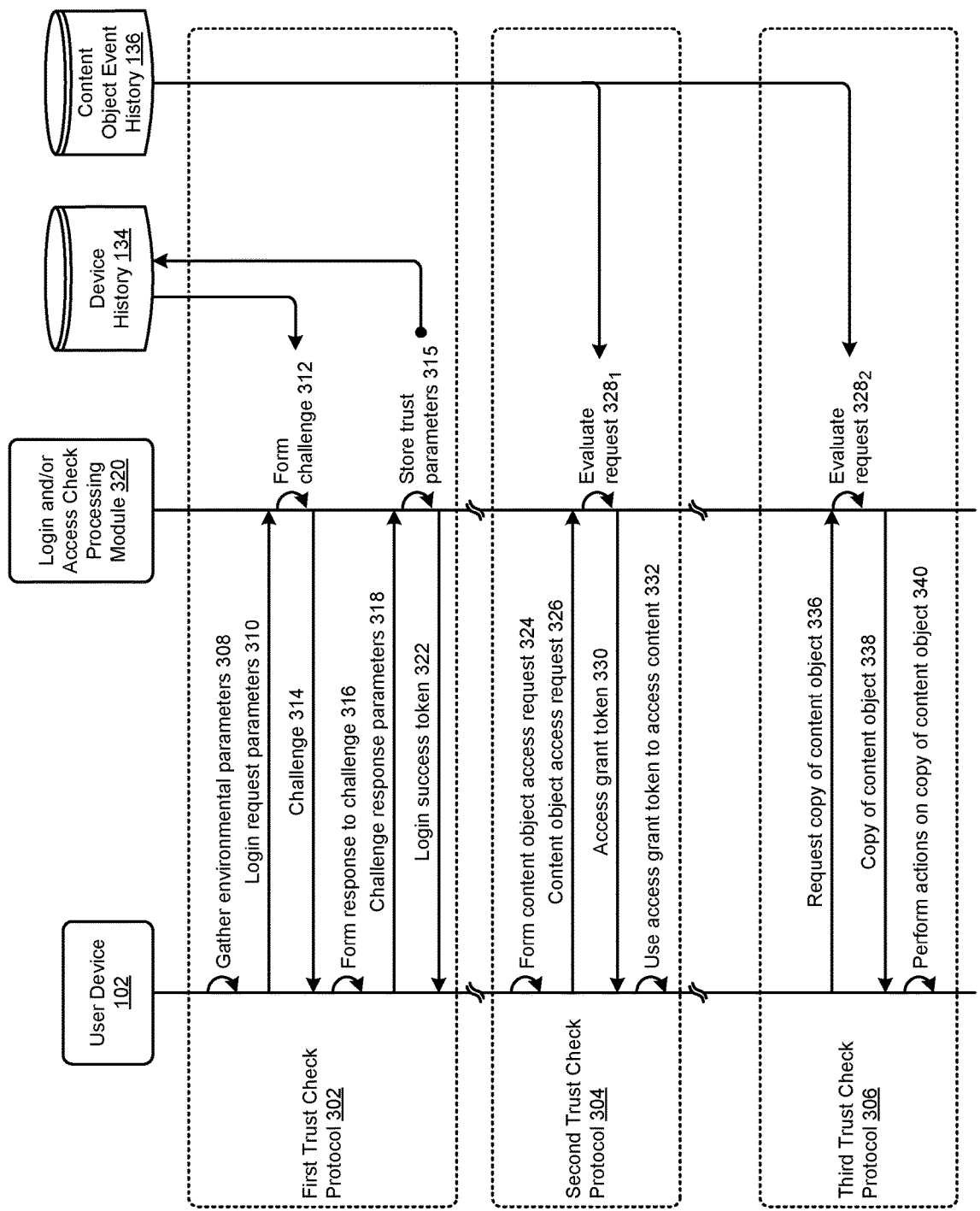
FIG. 3A and FIG. 3B depict example protocols as used in systems for allowing or denying access to content management system data according to content-based device trust levels, according to an embodiment.
Figure 3B:
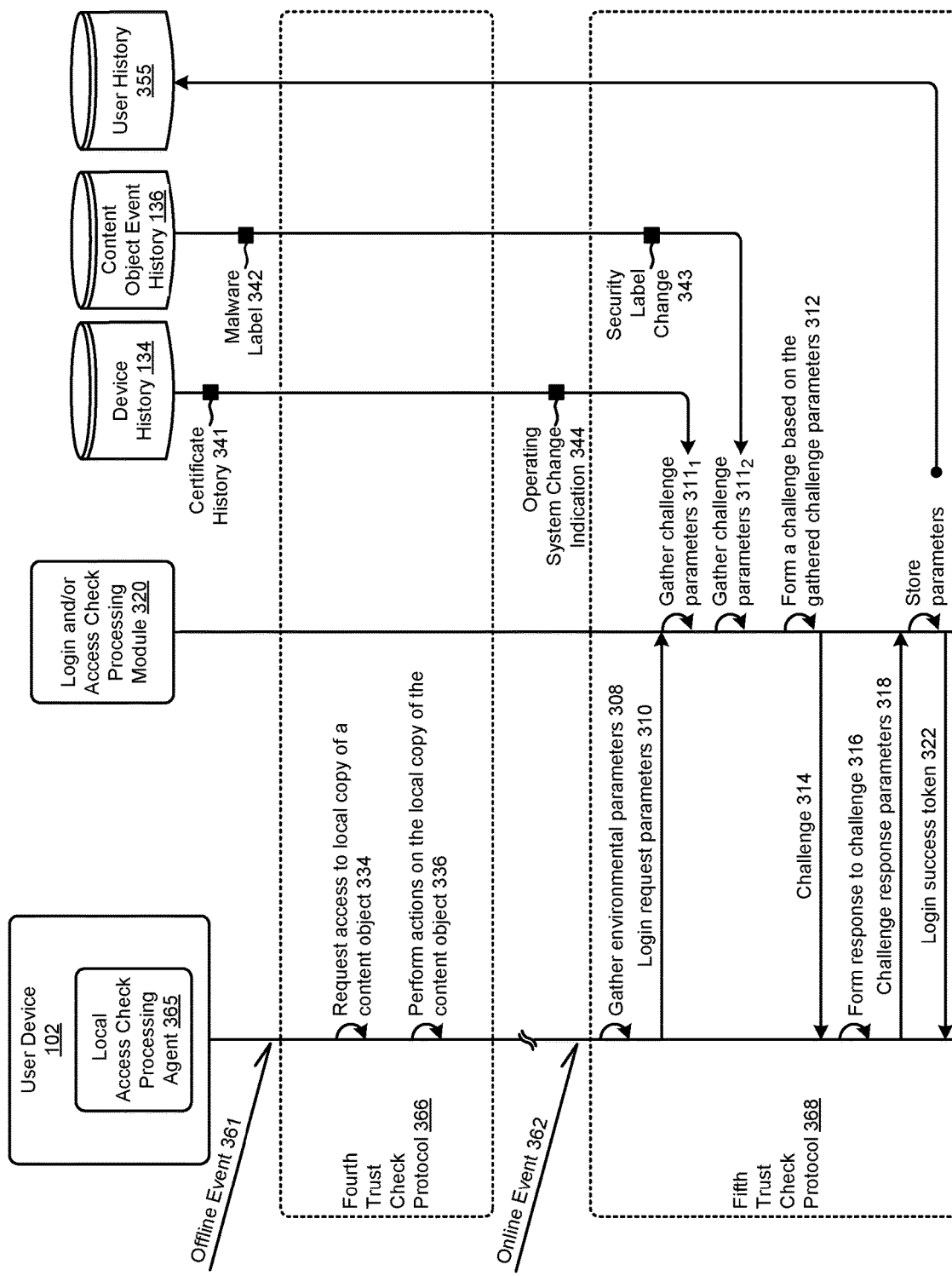

FIG. 3A and FIG. 3B depict example protocols as used in systems for allowing or denying access to content management system data according to content-based device trust levels. As an option, one or more variations of protocols or any aspect thereof may be implemented in the context of the architecture and functionality of the embodiments described herein and/or in any environment.

The several protocols of FIG. 3A and FIG. 3B are being presented to show specific steps that are taken by specific processing elements when carrying out the protocols. Specifically, FIG. 3A shows a first trust check protocol 302 to establish device trust based on a login attempt, a second trust check protocol 304 to provide one or more access tokens to a trusted device, and a third trust check protocol 306 to provide a copy of a token to a trusted device. The shown protocols are merely illustrative examples. Outcomes other than the shown outcomes are possible.

When carrying out the first trust check protocol, execution of an agent of user device 102 gathers information pertaining to the device itself and its environment (operation 308). A set of information pertaining to the device itself and its environment (e.g., login request parameters 310) is delivered to the CMS or its agent (e.g., to an operational element that performs the shown login and/or access check processing module 320). In turn, the CMS or its agent may provide a login success token (e.g., token 127 such as is shown in FIG. 1B1 and FIG. 1B2) or may form a challenge (operation 312) that is provided back to the device. In forming the challenge, any portions of user device history 134 may be accessed and the content of the user device history is used to inform whether or not to form a challenge. For example, if a relatively long period of time has transpired between the current login request and the most previous login request, then a challenge, possibly including a multi-factor challenge, might be inserted into the protocol.

In the event that a CMS or its agent does provide a challenge (e.g., via message 314) to the device, the device can form a response to the challenge (operation 316). In some case, the device can provide a response to the challenge by sending a set of challenge response parameters (message 318) back to the CMS or its agent. In the event that the challenge is deemed to be met, then the CMS or its agent stores trust parameters (e.g., via operation 315) and responds to the device with a login success token (via message 322). A login success token may have a limited duration during which the login success token is deemed to be valid.

As used herein, login information may include any aspect or characteristic of the foregoing login request parameters. Moreover, as used herein, login information may include any aspect pertaining to the user and/or the user device, and/or any aspect of the hardware or software configuration of the user device, and/or the network over which the user device is communicating with the content management system, and/or may subsume any other data items other than data that is either the actual stored content of a sought-after content object or data that is derived from or determined by inspection of stored bits of the actual stored content of a sought-after content object.

Additional trust check protocols (e.g., for content object access and/or for content object downloading) can be carried out. Specifically, and as illustrated by second trust check protocol 304, the device may form a content object access request (operation 324) which is then delivered (e.g., via message 326) to the CMS or agent. The CMS or agent, in turn evaluates the content object access request (operation 328$_1$) and if the request is allowed, then an access grant token is sent to the device (e.g., via message 330). The device in turn stores the access grant token for use in subsequent content object accesses (operation 332).

In some cases, the device seeks to request a copy of a sought-after content object. In this case, a still further, third trust check can be carried out. The device may request a copy of the sought-after content object (e.g., via message 336), and the CMS or agent will evaluate the content object copy download request (operation 328$_2$). In this case, when the CMS or agent evaluates the content object copy download request, the CMS or agent accesses content object event history 136. The download request may be allowed or denied on the basis of a determined history. Specifically, and strictly as an example, the download request might be denied based on aspects of a recent series of download occurrences. On the other hand, if the download request is deemed to be allowed, then a copy of the requested content object is provided to the device (e.g., via message 338). The device can then perform actions on a downloaded device-local copy of the content object (operation 340).

In some scenarios, a user device is configured to permit a device access to a device-local copy of a content object even when the device is offline. Nevertheless device check processing can be carried out by an agent on the device. Such a scenario, including going offline and coming back online is shown and described as pertains to FIG. 3B. Specifically, FIG. 3B shows a fourth trust check protocol 366 that is carried out after a device goes offline (e.g., via offline event 361), and a fifth trust check protocol 368 that is carried out after a device goes back online (e.g., via online event 362). Specifically shown and discussed is the local access check processing agent 365 that serves to perform device trust operation on the device itself, when the device is offline. When the device is offline, the device can at least potentially access a local copy of a content object. Specifically, when the device is offline, the local access check processing agent can carry out several operations directly on the device—and without the need for online communication with the CMS.

In the example shown, a user who is operating the device may want to access a local copy of a content object. To do so, a request is made (operation 334) and, in the event that the content object sought to be accessed is stored locally at the device, then operations (e.g., READ, MODIFY, WRITE, etc.) can be performed on the local copy. Results of the foregoing operations (e.g., READ, MODIFY, WRITE, etc.) that are performed on the local copy can be stored locally.

At some moment in time, the device may go back online, raising an occurrence of an online event 362, at which time the shown fifth trust check protocol is initiated. It can happen that during the time that a device is offline, the device-local content object is vulnerable. For example, malware could at least potentially be inserted into the content object. Then, when the device goes back online, the CMS is susceptible to malware infection and/or at risk of propagating a malware infection. For example, any malware that had been inserted into the content object might be uploaded to the CMS, which malware in turn could be propagated to many users of the CMS.

To protect against occurrence of such an unwanted scenario, fifth trust check protocol 368 is carried out. As shown, the fifth trust check protocol begins when the device gathers environmental parameters (operation 308). Such environmental parameters are provided to the CMS. The CMS in turn carries out several gathering operations (e.g., gather challenge parameters 311$_1$ and operation gather challenge parameters 311$_2$). In a first gathering operation, user device history 134 is accessed. Various historical events are considered. For example, the user device history might show that an authentication certificate has a recent history (e.g., certificate history 341) of being tampered with or otherwise changed. Additionally, or alternatively, the user device history might show that the device has a recent history of being updated with a new version of an operating system (e.g., as indicated by operating system change indication 344). Additionally, or alternatively, content object event history 136 can be accessed, which might reveal that a security designation (e.g., a security label) had changed during the time that the device was offline. In certain situations it can happen that content object event history 136 indicates that a particular content object had been detected as being malware and, as such, now has been labeled as malware (e.g., via malware label 342).

In other situations it can happen that content object event history 136 indicates that a particular content object has a recently changed security label (e.g., as indicated via security label change 343). In such situations, login and/or access check processing module 320 can form a challenge based on the gathered challenge parameters (operation 312). When the CMS or its agent provides a challenge to the device (e.g., via message 314), the device forms a response to the challenge (operation 316) and then sends a set of challenge response parameters (message 318) back to the CMS or its agent. The CMS or agent can store the occurrence in user history 355. The user history can be accessed by the CMS when evaluating trust parameters to determine trust levels.

Figure 4:
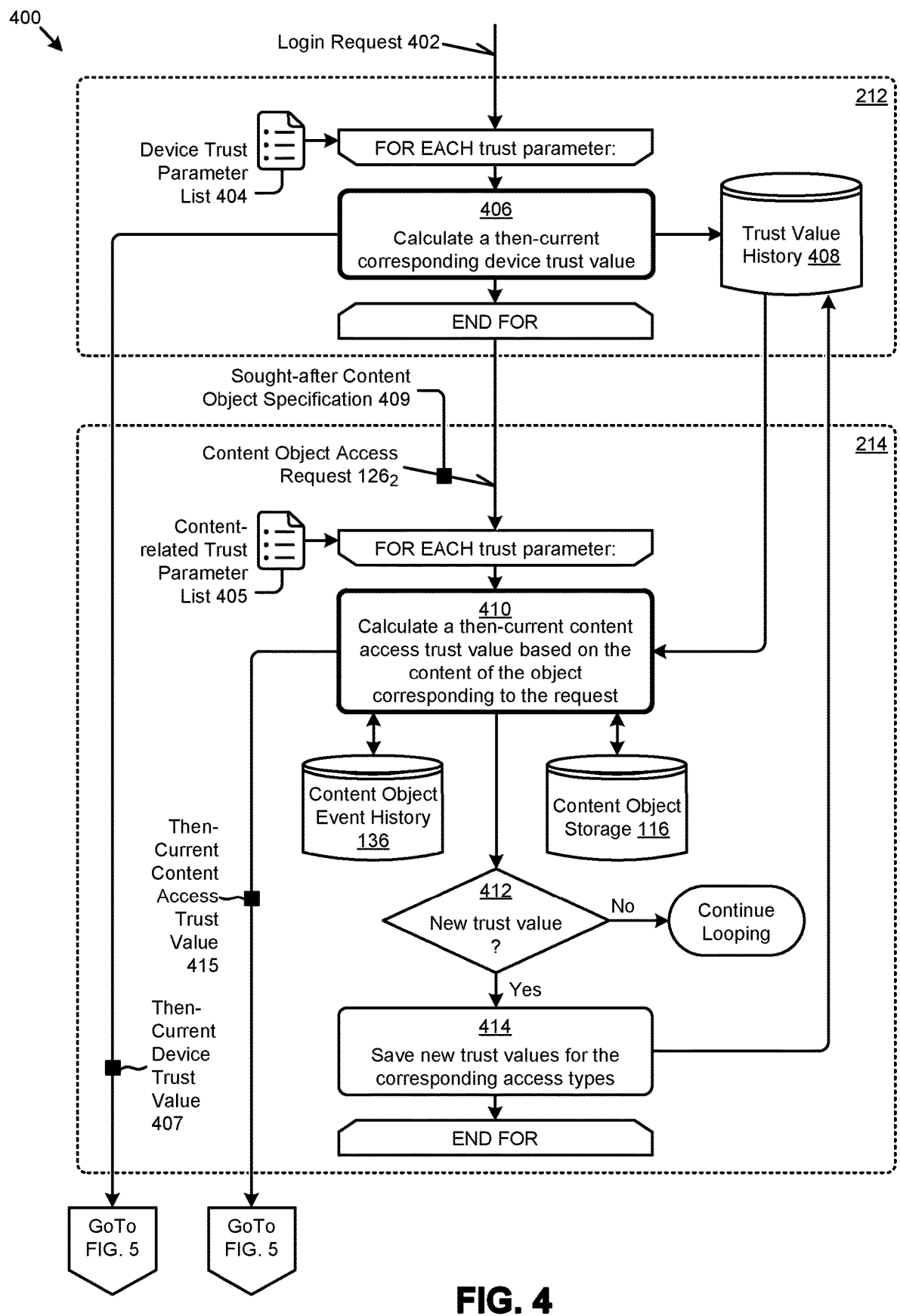
FIG. 4 depicts a two-step device trust processing technique as used in systems for allowing or denying access to content management system data according to content-based device trust levels, according to an embodiment.

One way to evaluate trust parameters to determine trust levels is shown and described as pertains to FIG. 4.

FIG. 4 depicts a two-step device trust processing technique 400 as used in systems for allowing or denying access to content management system data according to content-based device trust levels. As an option, one or more variations of the two-step device trust processing technique 400 or any aspect thereof may be implemented in the context of the architecture and functionality of the embodiments described herein and/or in any environment.

The figure is being presented to illustrate how calculation of then-current device trust values are used to inform calculation of content access trust values. Further, the figure is being presented to illustrate how such trust calculations that had been made at a first time can be saved in a history repository, and then used when making subsequent trust calculations.

The shown device trust processing technique commences when a login request 402 is received from a user device. Specifically, process 212 is invoked to calculate a plurality of then-current device trust values corresponding to a plurality of device trust parameters. The plurality of then-current device trust values can be calculated by entering a FOR EACH loop that iterates over a plurality of device trust parameters. In this implementation, the iterations are informed by a device trust parameter list 404. Each item of the device trust parameter list has a corresponding method for calculating a then-current device trust value that corresponds to the device trust parameter of a particular iteration (step 406). Any calculated then-current device trust value that corresponds to the device trust parameter of a particular iteration can be stored in a durable repository (e.g., trust value history 408. The trust value history may be used by later-invoked processes.

In the example of FIG. 4, process 212 is invoked upon a login request 402, however process 212 may be invoked at any moment in time. In some cases, process 212 is commenced when any sort of change in the device and/or its environment is detected. Moreover, in some cases, process 212 is commenced independent of occurrence of a login request. Strictly as one example, process 212 might be commenced when a software module (e.g., application component or operating system component) is downloaded into the device. In this situation, process 212 might be commenced upon download or installation of such a software module to the device. Commencement of process 212 might occur in other situations and/or under other environmental and/or temporal conditions such as even after the device had logged out and before a subsequent login request has been made.

The device trust parameter list 404 may be composed of any one or more sets of parameters that can have an associated then-current value. Strictly as examples, a device trust parameter may correspond to a value (e.g., TRUE or FALSE) of whether or not the device has a configured copy of a virus checker, and/or a device trust parameter may correspond to a value (e.g., TRUE or FALSE) of whether or not the device has a configured copy of a virus checker, and/or a device trust parameter may correspond to a manufacturer's name or model identification and/or a value that corresponds to whether or not the device has up-to-date security patches, etc. The foregoing are merely examples, and other device trust parameter values can be used to calculate content-related trust values, which in turn can be used to make allow/deny determinations.

The operations of process 214 illustrate one implementation of how device trust parameter values can be used to calculate content-access trust values. Specifically, and as shown, a FOR EACH loop iterates over each entry in a content-related trust parameter list 405. The loop can be entered in response to an incoming content object access request 1262. The content object access request may include a sought-after content object specification 409. For example, the sought-after content object specification may refer to a folder or a file of the CMS. Alternatively or additionally, the sought-after content object specification may refer to a folder or a file that is in any local storage area that is local to the user device (e.g., as a result of a download from the CMS).

The actual content of the content object referred-to by the content object specification can be accessed by the CMS or its agent prior to granting (or denying) access to the user device to access the content object referred to by the content object specification. More specifically, the actual content of the content object referred to by the content object specification might be accessed in response to receipt of an incoming content object access request. Additionally, or alternatively, the actual content of the content object referred to by the content object specification might have been pre-processed (e.g., prior to receipt of the incoming content object access request), for example when the CMS or its agents consider the actual content of the content object for purposes of labeling (e.g., security and/or privacy labeling) and/or when the CMS or its agents consider the actual content of the content object for purposes of classification (e.g., for the content to be classified and/or labeled as containing malware) or for the purpose of identifying and/or quantifying the presence of personally identifiable information (PII) in the actual content of the content object.

This is shown in FIG. 4 at step 410 where, in each iteration, step 410 calculates a then-current content access trust value 415 based on the content of the content object corresponding to the request. Such calculations often require accesses to the content of the content object storage 116 and/or to the content object event history 136. For example, consider a case where one of the content-related trust parameters of the content-related trust parameter list 405 specifies calculation of a then-current count of the number of occurrences of PII in the content object referred to by the content object specification. In that case, the content of the content object referred to by the content object specification is accessed and the count of occurrences of PII in that content object is assigned to a then-current content access trust value. As another example, consider a case where one of the content-related trust parameters of the content-related trust parameter list specifies determination of recent accesses by devices to the content object referred to by the content object specification. In this case, the content object event history 136 of the content object referred to by the content object specification is accessed and a characterization of the number of recent accesses by other devices is assigned to a then-current content access trust value for that iteration.

In some cases, it can happen that a then-current content access trust value for a particular iteration breaches a new value threshold (decision 412). If a particular threshold is breached (e.g., corresponding to the "Yes" branch of decision 412), then further processing is carried out so as to determine what access types (e.g., READ, MODIFY, WRITE, etc.) might be affected by the specific threshold breach. In some embodiments, a filter or a precedence regime or a priority ranking is applied to determine a particular one from among multiple additional further processing options. Such a determination can be made based on characteristics of the specific threshold breach.

The calculated then-current content access trust value for the particular iteration is then stored (step 414) in trust value history 408. As such, a trust value history for the device, possibly including an allow/deny history for the device, can be maintained in this manner to permit the trust value history to be accessed in downstream processing. In some situations it can happen that a then-current content access trust value or combination of then-current content access trust values may cause a particular type of challenge to be formed. For example, if there were many recent accesses to a folder by many different devices (i.e., an event history indicative of a 'bot'), then a new, possibly multi-factor challenge might be issued prior to making the determination to allow or deny the requesting device to access the content object referred to by the content object specification.

The determination to allow or deny the device to access the content object referred to by the content object specification can be made on the basis of a combination of a then-current device trust value 407 and a then-current content access trust value 415. Combinations can be codified as rules, which rules can include logical expressions that, when evaluated, inform decision-making as to whether or not, and/or under what circumstances, the device can access the requested content object. One possible rule evaluation technique is shown and discussed as pertains to FIG. 5.

Figure 5:
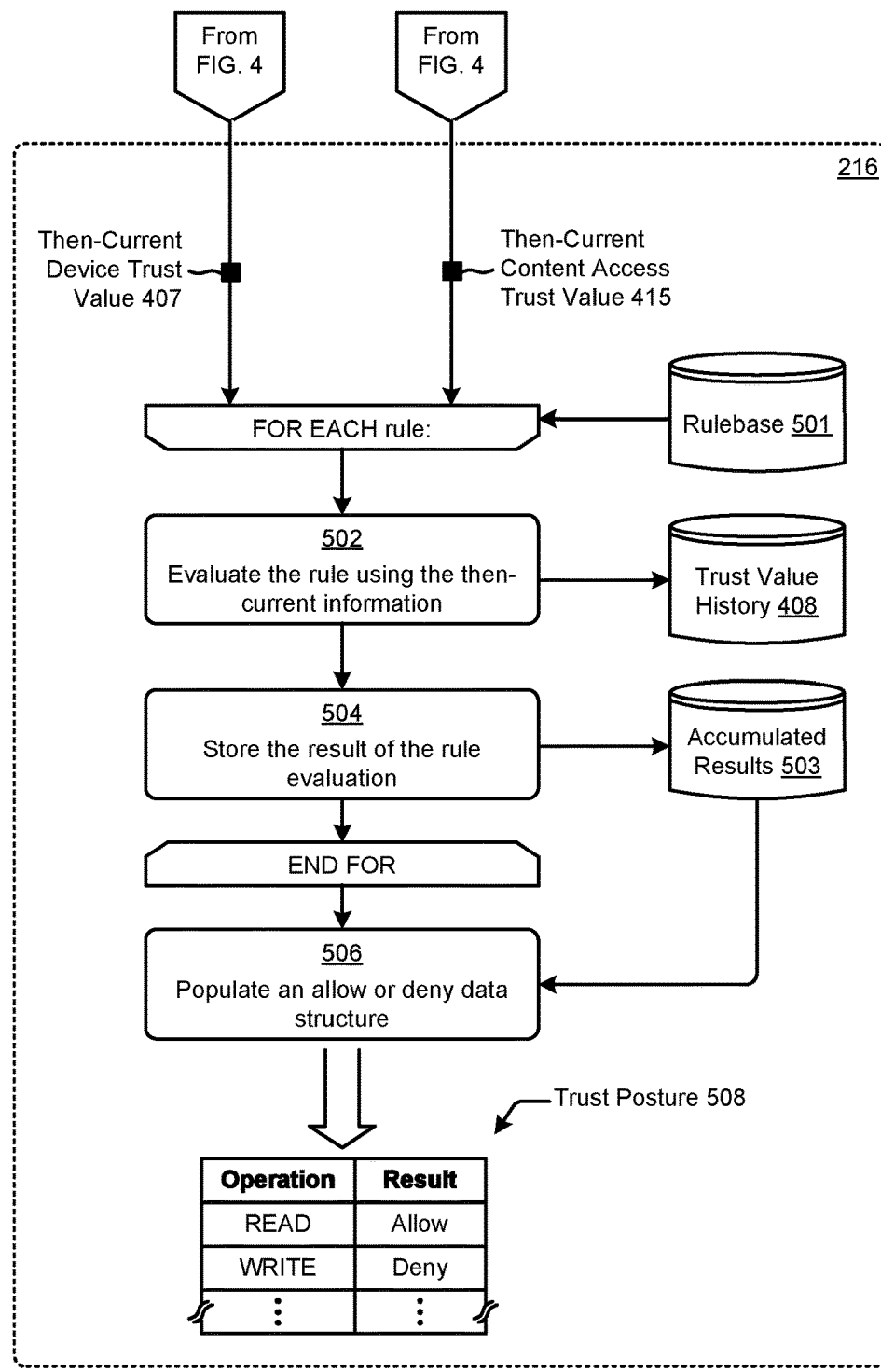
FIG. 5 depicts a device trust rule evaluation technique as used in systems for allowing or denying access to content management system data according to content-based device trust levels, according to an embodiment.

FIG. 5 depicts a device trust rule evaluation technique 500 as used in systems for allowing or denying access to content management system data according to content-based device trust levels. As an option, one or more variations of device trust rule evaluation technique 500 or any aspect thereof may be implemented in the context of the architecture and functionality of the embodiments described herein and/or in any environment.

The figure is being presented to illustrate one implementation (e.g., the steps of process 216) of a technique to establish a trust posture based on the results (e.g., a then-current device trust value 407 and a then-current content access trust value 415) of the two-step device trust processing. A trust posture 508 may include a numeric value on a scale (e.g., a probability of a future occurrence), or a trust posture may include a plurality of allow/deny indications that correspond to a respective plurality of possible operations that could prospectively be applied over a content object. In some cases, a trust posture may include a binary 1/0 or a binary allow/deny indication to apply to the then-current request.

In this specific embodiment, the trust posture is codified as a plurality of allow/deny indications that correspond to a respective plurality of possible operations that could be applied over a particular content object. The steps of process 216 commence upon receipt of a then-current device trust value 407 and a then-current content access trust value 415, such as had been calculated in process 212 and process 214 of FIG. 4. Specifically, upon receipt of a then-current device trust value 407 and a then-current content access trust value 415, a FOR EACH loop is entered such that the shown processing is performed iteratively over a plurality of rules drawn from a rulebase 501. More specifically, in each iteration, a rule is evaluated (step 502) using then-current information. The then-current information used in the rule evaluation may comprise then-current device trust values, then-current content access trust values, and values drawn from a trust value history 408.

The result or results of the rule evaluations are stored (step 504) as accumulated results 503, which accumulated results are accessed again after the last rule evaluation iteration. Strictly as one example, step 506 populates entries in an allow/deny data structure where each entry associates an allow or deny indication with a particular operation (e.g., READ, MODIFY, WRITE, etc.).

In this and other embodiments, accumulated results 503 stores rule evaluation results for each rule. In some cases, a rule is specific to a particular operation or function. For example, a first rule might be specific to a READ operation, whereas a different second rule might be specific to a WRITE operation. To illustrate, a first rule might handle the situation, "RULE1: If the device does not have virus checking enabled, then deny WRITE operations", whereas a different or second rule might handle the situation "RULE2: If the device does not have virus checking enabled, then allow only READ operations". As such, operation-specific entries can be made where each entry associates an allow or deny indication with a particular operation. Continuing discussion of the foregoing situations, if the requested operation was to "Edit" (e.g., demanding both READ and WRITE grants), and the device "does not have virus checking enabled", then the trust posture might include an entry to allow functions that involve a READ operation, but deny functions that involve a WRITE operation.

There are many techniques for codifying rules. In some cases, a rule is implemented as a method or subroutine. In other implementations, a rule is implemented as a logical expression that can be evaluated using a combination of then-current values. In some cases, a logical expression includes a return value of a call to a method or subroutine that is executed using then-current values. One possible rule codification technique involving the foregoing techniques is shown and described as pertains to FIG. 6A, FIG. 6B, and FIG. 6C.

FIG. 6A depicts a rule codification technique as used in systems that process dynamically determined risk profiles when determining whether or not to allow or deny operations. As an option, one or more variations of rule codification technique 6A00 or any aspect thereof may be implemented in the context of the architecture and functionality of the embodiments described herein and/or in any environment.

As shown, rulebase 501 is a table of entries where each row of the table has a logical expression, an entry corresponding to "If TRUE", an entry corresponding to "IF FALSE", and an "Override" indication. The entry corresponding to "If TRUE", as well as the action corresponding to "IF FALSE", can be an explicit allow or deny indication, or an action to take (or a series of actions to take) "If TRUE", as well as an action to take (or a series of actions to take) "IF FALSE". In some cases an entry corresponding to "If TRUE" or "If FALSE" can be a "don't care" indication such that a different rule might inform a particular action to take.

To illustrate, and strictly as an example, if the logical expression codifies the semantics of the sought-after information is sensitive (e.g., determined by "Label=' Sensitive'") at the same time that the device is determined to be at a remote location (e.g., determined by "Device=' Remote'"), and if both of those expressions are true, then the action to be taken is to deny the requested access. Otherwise, the action to be taken is to allow the requested access.

In some cases, a particular rule can have actions to take other than allow or deny. For example, and as shown, if the device is deemed to be remote (e.g., as determined by evaluation of the expression "Device=' Remote'") and if the sought-after information contains personally identifiable information (e.g., as determined by evaluation of the expression "Content.contains (PII)" and if a multi-factor authentication challenge is either stale or has not been successfully accomplished, (e.g., as determined by evaluation of the expression "MFA==' Stale'"), then the action to take is to raise a challenge to the requesting device.

The foregoing is merely one example of providing a hardened security perimeter based on a multiple terms (e.g., variable values and/or states). In some situations, environmental considerations are dominant over the outcomes of deep content inspection. In other situations, the outcomes of deep content inspection is dominant over environmental considerations. In still further scenarios, a particular combination of (1) the outcomes of deep content inspection, and (2) the then-current set of environmental considerations causes a "step-up" or confidence increase in one or more of, user authentication (e.g., via performing a multi-factor authentication challenge), device authentication (e.g., via accessing third party device risk profiles, etc.), or deepening or reevaluating results of deep content inspection, etc. Additionally or alternatively the semantics of a "step-up" might mean that a risk threshold is reduced. In cases when a risk threshold is reduced, it might be temporarily reduced (e.g., as pertains only to the then current events), or a particular risk threshold might be reduced as an outcome from a machine learning model.

In some cases, a particular rule can be defined to override other rules. For example, if the user that is associated with the requesting device has a role as an administrator (e.g., as determined by evaluation of the expression "User.role=' Admin'"), then the request will be allowed as an override to other rules that may have evaluated to a denial of the request.

The foregoing are merely illustrative examples. Many additional specific rules can be codified to be able to address a multitude of other situations. Strictly as non-limiting examples, a rule can include an expression that gauges the quantity (e.g., relative to a threshold) of PII as a TRUE/FALSE determinant; and/or a rule can include an expression that gauges the continuity of a particular device over time such that devices that have a longevity or pattern of trust are deemed to be more trustworthy than devices that do not have a longevity or pattern of trust; and/or a rule can include an expression that results in different actions to be taken based on whether the user associated with the device is a "creator" of the sought-after content object, and/or whether the user associated with the device is an "owner" of the sought-after content object, and/or whether the user associated with the device is a "contributor" of the sought-after content object.

In some embodiments, an IP address associated with a user device and/or its environment may resolve to a particular geography that can be mapped to a political boundary. In some embodiments, the IP address can be used to identify the country from within which a request has originated. Thus it is possible to deny access if the request originates from a specific country (e.g., a country on a "watch list" or "threat list", etc.). Further, one or more IP addresses (e.g., hops along a routing path) can be used to identify suspicious activities, such as might arise from "Impossible Travel" where a user/device is showing (e.g., in a history file) as having been logged in from the United States at 7 am, and again from China at 9 am. Since it is impossible for this to happen, this user/device might be marked as being associated with a suspicious access pattern. Such a suspicious access pattern might cause the user/device and/or its associated IP addresses to be added as entries into a block list so as to block access to content objects. Similarly, under different conditions, and/or for different purposes, a user might be placed on an allow list, whereby only users who are on the allow list can access content.

Further details regarding general approaches to identifying suspicious access patterns are described in U.S. application Ser. No. 16/553,106 titled "AVOIDING USER SESSION MISCLASSIFICATION USING CONFIGURATION AND ACTIVITY FINGERPRINTS" filed on Aug. 27, 2019, which is hereby incorporated by reference in its entirety.

In some embodiments, the role of a particular device owner can be used in a rule. For example, if the device owner is marked as being assigned to a person having a role of an executive or if the device owner is marked as being assigned to a person having a role or function (e.g., administrator, specialist, etc.) of one who would typically access sensitive information, then more stringent rules and/or more frequent device checks might be performed and/or challenges might be raised more frequently. This is to mitigate risk if/when a device is mal-appropriated by a malefactor.

In some settings, changes in permissions and/or changes in roles, and/or changes in sharing boundaries (e.g., a sharing boundary based on the pattern of sharing/collaboration for a user and other users in the user's enterprise) are all indicative of increased vulnerability. As such, changes in permissions and/or changes in roles, and/or changes in sharing boundaries can be used in rules, and/or can be used to inform how rules are applied. For example, if a sharing boundary is expanded to include many additional collaborators, this sharing boundary expansion might be deemed to be a vulnerability, and as such, more stringent rules and/or more frequent checks might be performed and/or challenges might be raised more frequently.

Further details regarding general approaches to identifying changes in sharing boundaries are described in U.S. application Ser. No. 16/553,073 titled "DYNAMICALLY GENERATING SHARING BOUNDARIES" filed on Aug. 27, 2019, which is hereby incorporated by reference in its entirety.

Events that lead to, or are otherwise related to the foregoing permissions changes and/or changes in roles, and/or changes in sharing boundaries can be codified into rules of the rulebase. In some cases, determining events that lead to or are otherwise related to the foregoing changes can use machine learning models that learn to classify usual or expected patterns differently from anomalous, suspect, or suspicious patterns. As such, machine learning models can be employed to identify potential anomalous behaviors. Moreover, a rule can be codified to be informed by outputs of such learning models. In some cases, a rule can incorporate a method or subroutine to collect signals that are used as inputs to a learning model, and the action to take upon evaluating the rule can be based on the outputs of the learning model.

Additionally or alternatively, machine learning models can be employed to learn the sensitivity level or other characteristics of content that a user usually interacts with, and thus such machine learning models can be employed to identify if/when a particular user/device is accessing content that is more sensitive or otherwise characteristically different than had been accessed in prior timeframes. A rule can incorporate a method or subroutine to collect signals that are used as inputs to such a machine learning model, and the action to take when evaluating the rule can be based on the changes as reported by the machine learning model.

Security-oriented rules and corresponding machine learning models can be configured to consider a range of security policies. Specifically, various security policies might be applicable to certain types of content objects. Strictly as one example, a policy might cover the semantics of "prevent download if a file has a classification label of 'CONFIDENTIAL'". As another example, a policy might cover the semantics of "prevent download if a file has content that is deemed to be 'PII'". Based on training over a corpus of documents that have been labeled with particular classification labels (e.g., "CONFIDENTIAL", "PII", etc.) a machine learning model can learn which content objects have content that is similar to the content as was used in the training corpus. As such, rules that incorporate use of such machine learning models serve to improve security by applying security policies to content objects that have been automatically determined to be similar in content to the content of content objects that have been considered in the training of the machine learning models.

Rules can be codified to consider the existence of and/or expiration of access tokens. Such access tokens might have been provided to a device (e.g., during an exchange such as in the heretofore discussed protocols). Furthermore the same or different rules can be codified to consider the existence of, validity of, and/or expiration of, offline access tokens.

Still further, security-related rules can be codified and applied to a content object request. Again, strictly as an example, if it is detected that a device is vulnerable (e.g., communicating over an unsecured network) the action of a rule can cause automatic watermarking of any content that is accessed on that device. As another example, if a requested content object is deemed to be subject to a legal hold then, rather than satisfying the request, an administrative alert can be raised. Additionally or alternatively, the user of the requesting device can be subjected to a challenge before the CMS attempts to satisfy the content object access request.

Even still further security-related rules can be codified and applied to a content object request. Again, strictly as an example, if it is detected that multiple content object access requests have been received from multiple different devices of the same user, then a rule that is configured to detect such a condition can cause a check to be made to confirm that the number of devices involved is below a threshold number of permittable devices. Such a threshold can be implemented using any known technique, one of which involves administration of a "device pinning" limit that serves to configure a threshold of how many devices are permitted for use by a particular user. Such a "device pinning" threshold can be used to prevent access from personal devices. Also, such a "device pinning" threshold can be used to prevent access from a large number of devices that might be infected with 'bot' malware. A device that is deemed to be an additional device that breaches a "device pinning" threshold might be subjected to a challenge. Moreover, such a challenge might be formed specifically with respect to any known aspects of the device and/or its environment.

There are many techniques for forming challenges and there are many outcomes that can be based on whether or not, or how a challenge is satisfied. Moreover, satisfaction of a challenge can be tied to particular outcomes or functions. Strictly as examples, a device can be challenged to provide a user/device identification code (e.g., a PIN). Such user/device identification code can be of any complexity. As examples, a user/device identification code can be tied to the functioning (e.g., block or allow) camera access, and/or a user/device identification code can be tied to device-specific encryption requirements, and/or to control access to (e.g., block or allow) and/or to control the behavior of a specific application. In some such cases, CMS-controlled (e.g., PIN-controlled) behavior of an application might include invocation of an agent to purposely delete data stored by the application. In some cases, the CMS-controlled behavior of an application or multiple applications might include requiring that a specific version of the application or applications be downloaded to the device before next actions. In some cases, signals that arise from the any one or more of the foregoing applications can be used to assess a device trust level and/or to enforce a device trust regime.

FIG. 6B depicts an action determination flow 6B00 that is used in conjunction with a rulebase. The shown flow can be initiated any time when there exists a set of parameters that correspond to at least some of the parameter used in the logical expressions of rulebase 501. More specifically, when operation 602 is carried out, any one or more of the foregoing parameters are applied to any corresponding rules of rulebase 501. If applying those parameters to any corresponding rules of rulebase causes the logical expression of the rule evaluate to one or more actions 601 (e.g., "Deny", or "Allow", or "Override"), then those actions that result from evaluating the rule are captured (operation 604). In some cases, there are multiple actions that arise from evaluating the rule. In some such cases the action(s) that arise from evaluation of a first rule might be in conflict with the action(s) that arise from evaluation of a second rule. In such situations, a filter (e.g., a precedence regime or priority ranking) can be applied to make a determination as to which of the multiple actions should be performed (operation 606), and/or which of the multiple actions should be ignored and/or, in the case where multiple actions are slated to be performed, an execution order is defined.

Figure 6C:
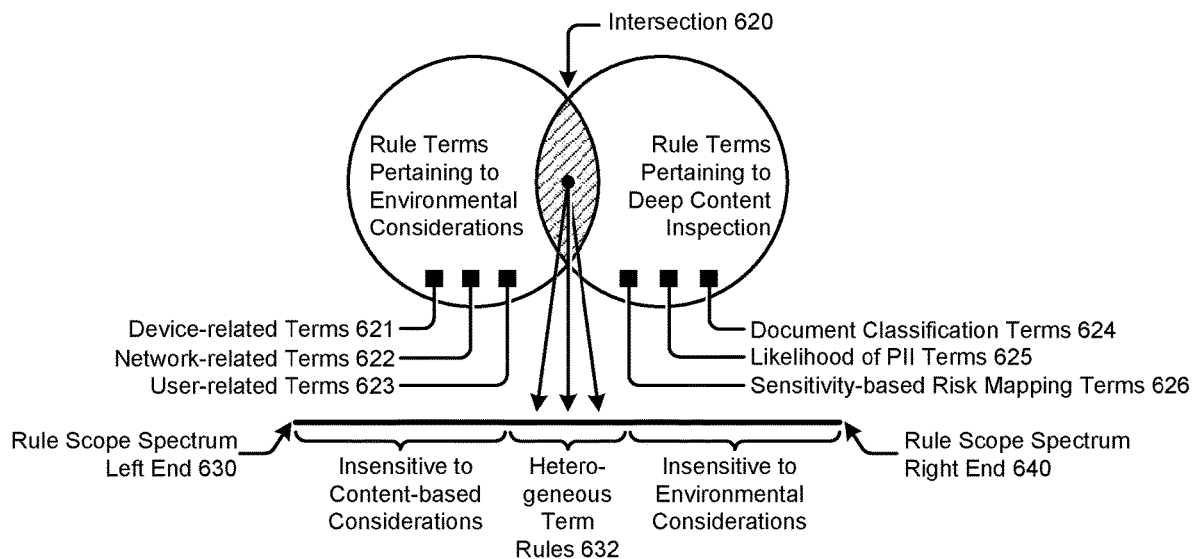
FIG. 6C shows several regions along a rule scope spectrum, according to an embodiment.

Now, returning to the discussion of FIG. 6A and FIG. 6B, in particular, returning to the discussion of the rules of rulebase 501, it can be seen that some of the logical expressions include multiple terms in the logical expression. Use of multiple terms in the logical expression of a rule facilitates formation of rules having varying scope across a wide spectrum. One possible rule scope spectrum is shown and described as pertains to FIG. 6C.

FIG. 6C shows several regions along a rule scope spectrum. The figure is being presented to illustrate how rules that use multiple heterogeneous terms in their logical expressions can cover a sweet spot of sensitivity. The figure includes a graphical depiction of intersection 620 of two classes of rule terms: A first class having rule terms that pertain to environmental considerations (e.g., a device term of the shown device-related terms 621, a network term of the network-related terms 622, a user term of the user-related terms 623, etc.), and a second class having rule terms pertaining to deep content inspection considerations (e.g., document classification terms 624, likelihood of personally identifiable information terms 625, sensitivity-based risk mapping terms 626, etc.).

Intersection 620 is shown to indicate a compound class having rule terms from both classes. Rules having logical expressions involving heterogeneous terms (e.g., terms from both classes) are in a third class shown as heterogeneous term rules 632. These heterogeneous term rules have characteristics that address deficiencies exhibited when rules contain terms of only one class. Specifically, and as shown near the rule scope spectrum left end 630, the first class of rules (e.g., rules having rule terms that pertain to only environmental considerations) is insensitive to deep content inspection considerations.

On the same spectrum, and as shown near the rule scope spectrum right end 640, the second class of rules (e.g., rules having rule terms that pertain to only deep content inspection considerations) is insensitive to environmental considerations. What is needed are rules that are include at least one term that pertains to environmental considerations and at least one term that pertains to deep content inspection considerations. In this manner, rules can be codified that involve heterogeneous terms. As such, these heterogeneous term rules can be sufficiently sensitive to both environmental considerations and content-based considerations.

To illustrate the need for rules that involve heterogeneous terms, consider again the examples given in the discussion of FIG. 2D. Specifically, consider the birthday card example previously discussed. In a naive implementation that results in unwantedly restricted behavior, since there is a large amount of uncertainty as to the security of the infrastructure over which the content object is being delivered, the delivery of the birthday card might be denied. A rule having terms pertaining to both environmental considerations as well as content-based considerations is needed. Further, consider a naive implementation that results in unwantedly permissive behavior. This can happen when a subject content object is deemed to be of low importance or sensitivity. Permissively, a covering rule might permit transmission of the subject content object due a perceived low risk involved in the subject matter of the subject content object. However, such permissive behavior fails to consider what might happen if multiple of such subject content objects that are individually deemed to be of low importance or sensitivity are sent to a malaprop. Hackers are notorious for combining multiple singular bits of information to form a composite, which in turn can be used to spoof or phish or perform other malicious actions.

As can be seen from the foregoing, what is needed are rules that have terms pertaining to both environmental considerations as well as content-based considerations. More particularly, what is needed are rules that consider both a particular device trust value (e.g., based on environmental considerations) as well as a corresponding content access trust value (e.g., based on content-based considerations).

In some specific cases, a rule that considers the risk involved in the endpoint is evaluated. For example, if the endpoint is merely suspected to be associated with malicious behavior, then a rule that considers that specific risk can restrict sending even medium sensitivity documents to the risky endpoint. It should be noted that a value of risk at an endpoint is a matter of statistical certainty/uncertainty. If an endpoint is unassailably known to be under control of a malaprop, then nothing would be sent to that endpoint. However if the endpoint is only suspected as being associated with a malaprop, then communication could be reasonably carried out when the risk accrued to the subject matter is low.

Additional Embodiments of the Disclosure

Instruction Code Examples

Figure 7A:
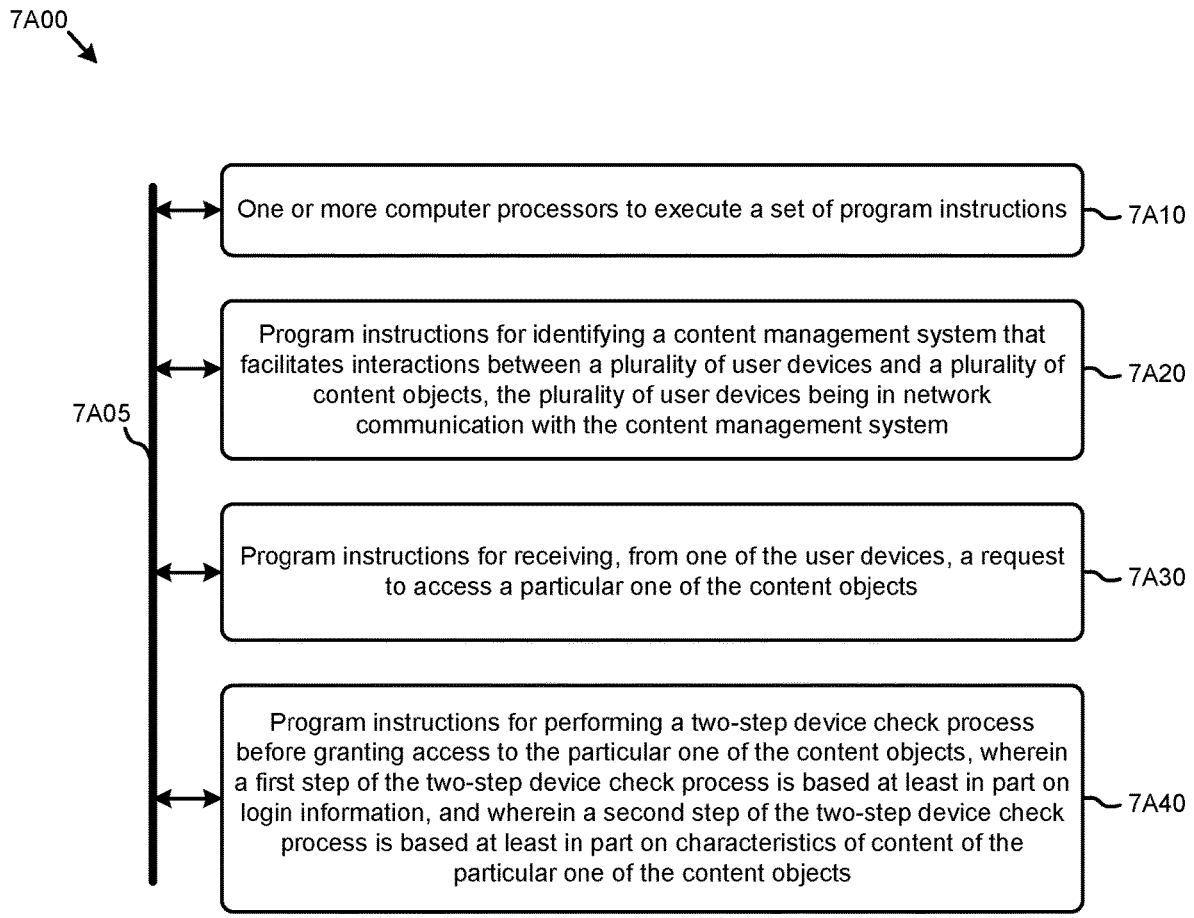
FIG. 7A, FIG. 7B, and FIG. 7C depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address making content-based deny/allow decisions. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: identifying a content management system that facilitates interactions between a plurality of user devices and a plurality of content objects, the plurality of user devices being in network communication with the content management system (module 7A20); receiving, from one of the user devices, a request to access a particular one of the content objects (module 7A30); and performing a two-step device check process before granting access to the particular one of the content objects, wherein a first step of the two-step device check process is based at least in part on login information, and wherein a second step of the two-step device check process is based at least in part on characteristics of content of the particular one of the content objects (module 7A40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
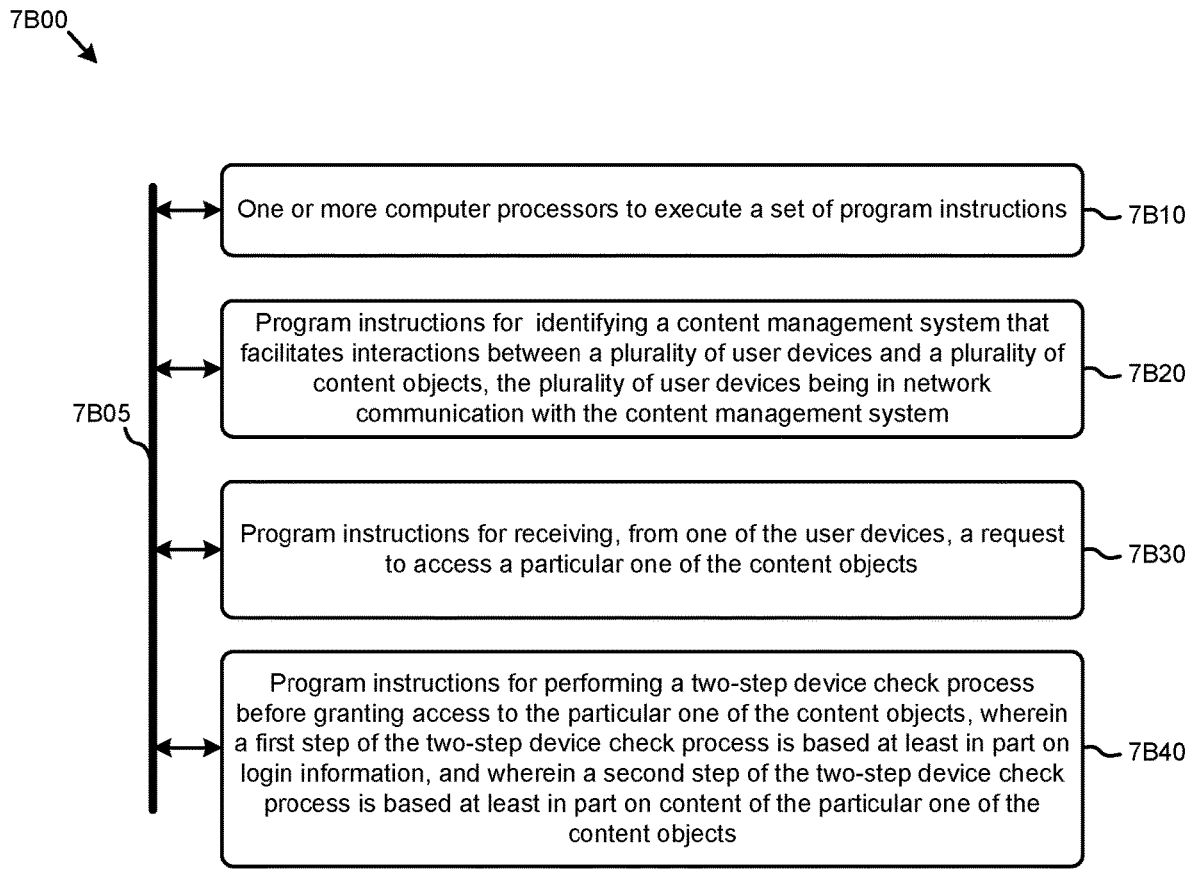

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising one or more computer processors to execute a set of program code instructions (module 7B10) and modules for accessing memory to hold program code instructions to perform: identifying a content management system that facilitates interactions between a plurality of user devices and a plurality of content objects, the plurality of user devices being in network communication with the content management system (module 7B20); receiving, from one of the user devices, a request to access a particular one of the content objects (module 7B30); and performing a two-step device check process before granting access to the particular one of the content objects, wherein a first step of the two-step device check process is based at least in part on login information, and wherein a second step of the two-step device check process is based at least in part on content of the particular one of the content objects (module 7B40).

Figure 7C:
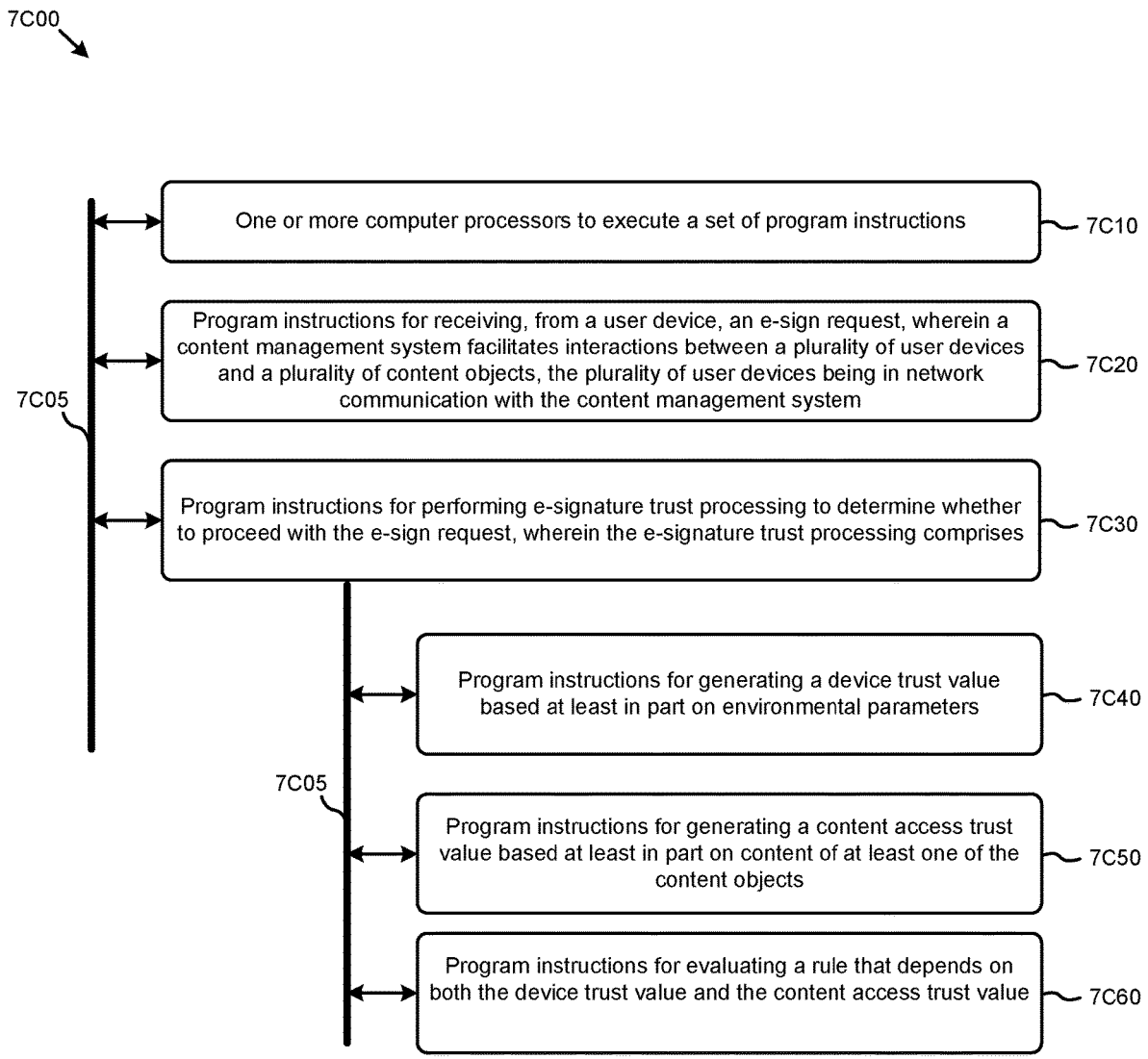

FIG. 7C depicts a system 7C00 as an arrangement of computing modules that are interconnected so as to operate cooperatively to implement certain of the herein-disclosed embodiments. The partitioning of system 7C00 is merely illustrative and other partitions are possible. As an option, the system 7C00 may be implemented in the context of the architecture and functionality of the embodiments described herein. Of course, however, the system 7C00 or any operation therein may be carried out in any desired environment. As an option, the system 7C00 may be implemented in the context of the architecture and functionality of the embodiments described herein. Of course, however, the system 7C00 or any operation therein may be carried out in any desired environment. The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with any other operations over communication path 7C05. The modules of the system can, individually or in combination, perform method operations within system 7C00. Any operations performed within system 7C00 may be performed in any order unless as may be specified in the claims. The shown embodiment implements a portion of a computer system, presented as system 7C00, comprising one or more computer processors to execute a set of program code instructions (module 7C10) and modules for accessing memory to hold program code instructions to perform any one or more steps of: receiving, from a user device, an e-sign request, wherein a content management system facilitates interactions between a plurality of user devices and a plurality of content objects, the plurality of user devices being in network communication with the content management system (module 7C20); performing e-signature trust processing to determine whether to proceed with the e-sign request (module 7C30), wherein the e-signature trust processing comprises; generating a device trust value based at least in part on environmental parameters(module 7C40); generating a content access trust value based at least in part on content of at least one of the content objects (module 7C50), and evaluating a rule that depends on both the device trust value and the content access trust value (module 7C60).

System Architecture Overview
Additional System Architecture Examples

Figure 8A:
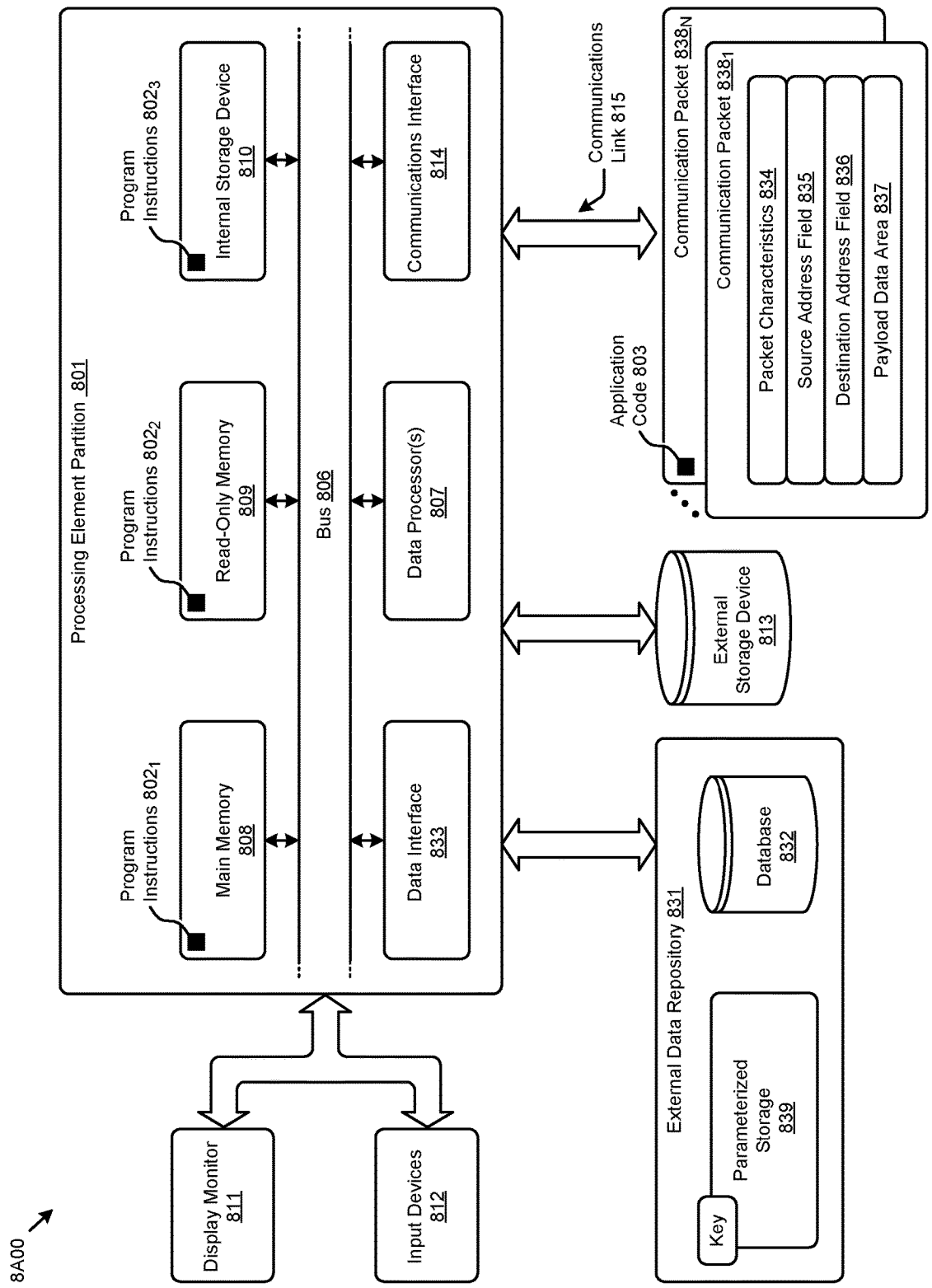
FIG. 8A and FIG. 8B present block diagrams of computer system architectures having components suitable for implementing embodiments of the present disclosure and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to allowing or denying access to content management system data according to content-based device trust levels. A module may include one or more state machines and/or combinational logic used to implement or facilitate the operational and/or performance characteristics pertaining to allowing or denying access to content management system data according to content-based device trust levels.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of allowing or denying access to content management system data according to content-based device trust levels). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to allowing or denying access to content management system data according to content-based device trust levels, and/or for improving the way data is manipulated when performing computerized operations for making access deny/allow decisions.

Figure 8B:
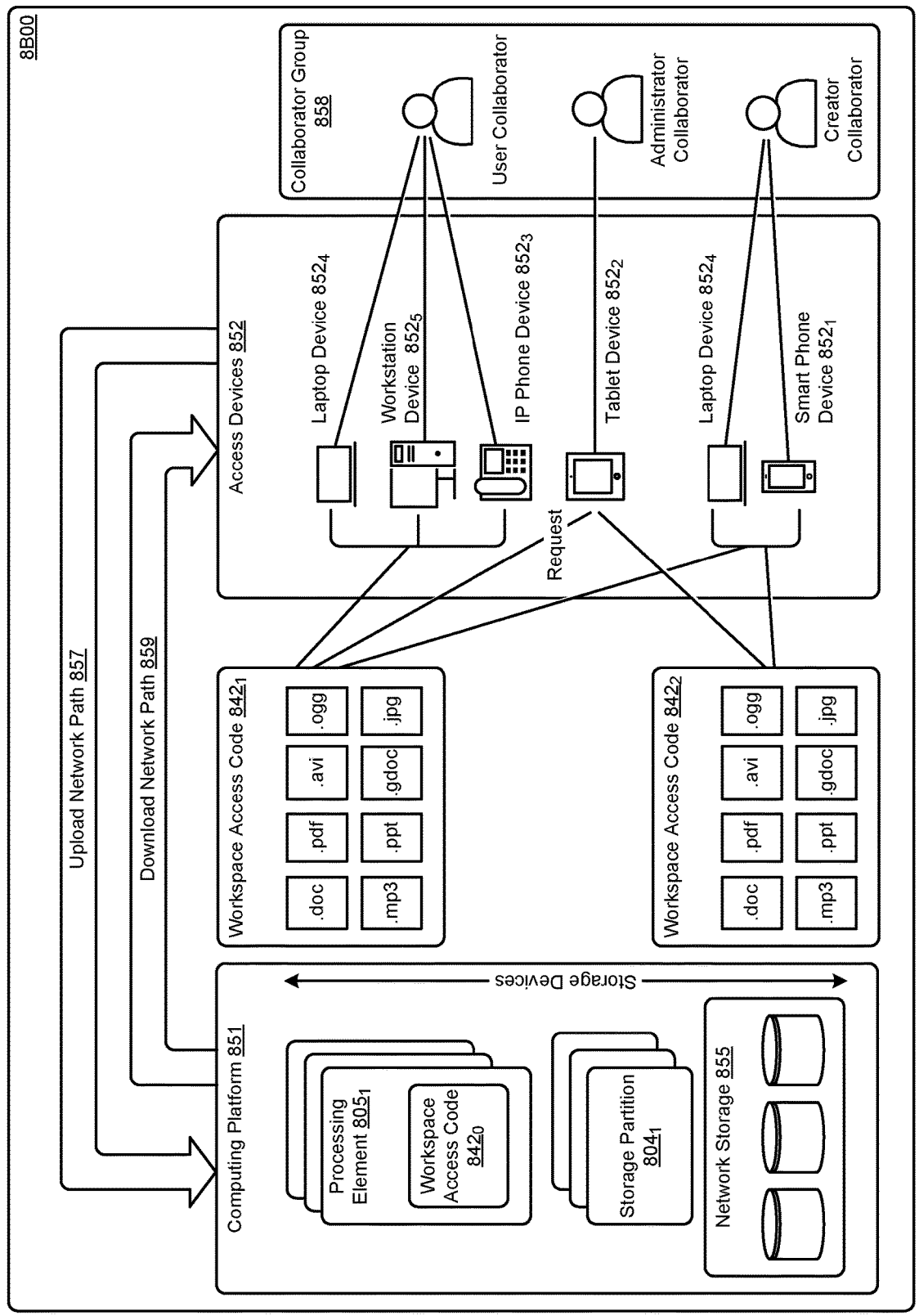

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   receiving, at a content management system, an e-sign event raised in response to an e-sign request from a user device, wherein the content management system facilitates interactions between a plurality of user devices and a plurality of content objects, the content management system performs acts to determine whether to allow or deny access to individual content objects of the plurality of content objects by respective user devices, the e-sign request corresponds to a content object of the plurality of content objects, and the content management system is associated with an e-signature system;
   forwarding the e-sign event, by the content management system, to the e-signature system to execute a multiple-step e-signature trust process, wherein the e-signature system responds to the e-sign event by executing the multiple-step e-signature trust process comprising:
      calculating a device trust value based at least in part on an environmental condition corresponding to the user device by at least accessing one or more first modules of the content management system, wherein the device trust value is dynamically determined based at least in part on a risk profile generated by a third party; and
      calculating a content access trust value based at least in part on a sensitivity level of contents of a content object, wherein the content access trust value is determined based on at least inspection of the content object by the content management system; and
   performing further processing of the e-sign event based upon a combination of the content access trust value and the device trust value when the combination fails to satisfy an adaptive risk tolerance threshold, wherein the adaptive risk tolerance threshold is based on at least the contents of the content object or its metadata.

2. The method of claim 1, wherein the environmental condition comprises at least one of, a device term, a network term, or a user term.

3. The method of claim 1, wherein the sensitivity level comprises at least one of, a document classification term, or a likelihood of personally identifiable information term.

4. The method of claim 1, wherein performing the further processing of the e-sign event comprises reevaluating results of deep content inspection.

5. The method of claim 1, wherein performing the further processing comprises at least one of, performing a multi-factor authentication challenge or accessing third party device risk profiles.

6. The method of claim 1, wherein the device trust value dynamically determined based at least in part on the risk profile generated by the third party corresponds to a non-CMS user and the third party maintains third party security risks or historical risk scores.

7. The method of claim 1, wherein generating the content access trust value comprises inspection, by the content management system, of stored bits that comprise the content of the content object.

8. The method of claim 1, wherein performing the further processing further comprises:
   generating a second content access trust value based at least in part on inspection of at least some stored bits that comprise the content of at the least one of the content objects, and
   evaluating a second rule that depends on both the device trust value and the second content access trust value.

9. The method of claim 8, wherein a filter, or a precedence regime or a priority ranking is applied to determine a particular one from among multiple additional further processing options.

10. The method of claim 1, wherein the content object is associated with a security label determined by inspection of stored bits that comprise the contents ofa content object.

11. A non-transitory computer readable medium having stored thereon a sequence of instructions which, when stored in memory and executed by one or more processors causes the one or more processors to perform a set of acts, the set of acts comprising:
   receiving, at a content management system, an e-sign event raised in response to an e-sign request from a user device, wherein the content management system facilitates interactions between a plurality of user devices and a plurality of content objects, the content management system performs acts to determine whether to allow or deny access to individual content objects of the plurality of content objects by respective user devices, the e-sign request corresponds to a content object of the plurality of content objects, and the content management system is associated with an e-signature system;
   forwarding the e-sign event, by the content management system, to the e-signature system to execute a multiple-step e-signature trust process, wherein the e-signature system responds to the e-sign event by executing the multiple-step e-signature trust process comprising:
      calculating a device trust value based at least in part on an environmental condition corresponding to the user device by at least accessing one or more first modules of the content management system, wherein the device trust value is dynamically determined based at least in part on a risk profile generated by a third party; and
      calculating a content access trust value based at least in part on a sensitivity level of contents of a content object, wherein the content access trust value is determined based on at least inspection of the content object by the content management system; and performing further processing of the e-sign event based upon a combination of the content access trust value and the device trust value when the combination fails to satisfy an adaptive risk tolerance threshold, wherein the adaptive risk tolerance threshold is based on at least the contents of the content object or its metadata.

12. The non-transitory computer readable medium of claim 11, wherein the environmental condition comprises at least one of, a device term, a network term, or a user term.

13. The non-transitory computer readable medium of claim 11, wherein the sensitivity level comprises at least one of, a document classification term, or a likelihood of personally identifiable information term.

14. The non-transitory computer readable medium of claim 11, wherein performing the further processing of the e-sign event comprises reevaluating results of deep content inspection.

15. The non-transitory computer readable medium of claim 11, wherein performing the further processing comprises at least one of, performing a multi-factor authentication challenge or accessing third party device risk profiles.

16. The non-transitory computer readable medium of claim 11, wherein the device trust value dynamically determined based at least in part on the risk profile generated by the third party corresponds to a non-CMS user and the third party maintains third party security risks or historical risk scores.

17. The non-transitory computer readable medium of claim 11, wherein generating the content access trust value comprises inspection, by the content management system, of stored bits that comprise the content of the content object.

18. The non-transitory computer readable medium of claim 11, wherein performing the further processing further comprises instructions which, when stored in memory and executed by the one or more processors causes the one or more processors to perform acts of:

generating a second content access trust value based at least in part on inspection of at least some stored bits that comprise the content of at the least one of the content objects, and evaluating a second rule that depends on both the device trust value and the second content access trust value.

19. A system comprising:

a storage medium having stored thereon a sequence of instructions; and one or more processors that execute the sequence of instructions to cause the one or more processors to perform a set of acts, the set of acts comprising, receiving, at a content management system, an e-sign event raised in response to an e-sign request from a user device, wherein the content management system facilitates interactions between a plurality of user devices and a plurality of content objects, the content management system performs acts to determine whether to allow or deny access to individual content objects of the plurality of content objects by respective user devices, the e-sign request corresponds to a content object of the plurality of content objects, and the content management system is associated with an e-signature system;

forwarding the e-sign event, by the content management system, to the e-signature system to execute a multiple-step e-signature trust process, wherein the e-signature system responds to the e-sign event by executing the multiple-step e-signature trust process comprising:

calculating a device trust value based at least in part on an environmental condition corresponding to the user device by at least accessing one or more first modules of the content management system, wherein the device trust value is dynamically determined based at least in part on a risk profile generated by a third party; and calculating a content access trust value based at least in part on a sensitivity level of contents of a content object, wherein the content access trust value is determined based on at least inspection of the content object by the content management system; and performing further processing of the e-sign event based upon a combination of the content access trust value and the device trust value when the combination fails to satisfy an adaptive risk tolerance threshold, wherein the adaptive risk tolerance threshold is based on at least the contents of the content object or its metadata.

20. The system of claim 19, wherein the device trust value dynamically determined based at least in part on the risk profile generated by the third party corresponds to a non-CMS user and the third party maintains third party security risks or historical risk scores.

* * * * *